US008966138B2

(12) United States Patent
Rathi et al.

(10) Patent No.: US 8,966,138 B2
(45) Date of Patent: Feb. 24, 2015

(54) COMMUNICATION BETWEEN A HOST DEVICE AND AN ACCESSORY USING MULTIPLE-ENDPOINT IDENTIFICATION

(71) Applicant: Apple Inc., Cupertino, CA (US)

(72) Inventors: Shailesh Rathi, San Jose, CA (US); Peter T. Langenfeld, Belmont, CA (US); Lawrence G. Bolton, Mahomet, IL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/756,223

(22) Filed: Jan. 31, 2013

(65) Prior Publication Data

US 2013/0145057 A1 Jun. 6, 2013

Related U.S. Application Data

(63) Continuation-in-part of application No. 12/893,719, filed on Sep. 29, 2010, now Pat. No. 8,509,694.

(60) Provisional application No. 61/378,790, filed on Aug. 31, 2010.

(51) Int. Cl.
*G06F 3/00* (2006.01)
*G06F 5/00* (2006.01)
*G06F 13/42* (2006.01)
*H04M 1/60* (2006.01)
*H04W 76/02* (2009.01)

(52) U.S. Cl.
CPC ......... *G06F 13/4286* (2013.01); *H04M 1/6041* (2013.01); *H04W 76/025* (2013.01)
USPC .......................................................... 710/38

(58) Field of Classification Search
CPC ..................................................... G06F 3/0635
See application file for complete search history.

(56) References Cited

U.S. PATENT DOCUMENTS

| 5,884,191 | A | 3/1999 | Karpus et al. |
| 7,143,155 | B1 * | 11/2006 | Reed et al. ............... 709/223 |
| 7,471,200 | B2 | 12/2008 | Otranen |
| 7,549,008 | B2 | 6/2009 | Kalayjian |
| 7,685,293 | B2 | 3/2010 | Deshpande et al. |

(Continued)

FOREIGN PATENT DOCUMENTS

| DE | 10-2006-012966 A1 | 10/2007 |
| WO | 2005/048554 A1 | 5/2005 |

OTHER PUBLICATIONS

Notice of Allowance mailed May 15, 2013, for U.S. Publication Application No. 2012-0052807, 21 pages.

*Primary Examiner* — Elias Mamo
(74) *Attorney, Agent, or Firm* — Kilpatrick Townsend & Stockton LLP

(57) ABSTRACT

Techniques for facilitating communication between a portable media device (PMD) and an accessory via multiple communication paths. The accessory has a unique accessory identifier that it can send to the PMD upon establishing a connection via each communication path. The PMD can determine whether the same accessory is connected via multiple communication paths based on the accessory identifier received via each communication path. The PMD can route information to the accessory and control routing of information from the accessory based on the set of communication paths that are currently connected and can dynamically change the routing as communication paths are connected and disconnected.

21 Claims, 11 Drawing Sheets

(56) References Cited

U.S. PATENT DOCUMENTS

| | | |
|---|---|---|
| 8,037,097 B2 | 10/2011 | Guo et al. |
| 2002/0049800 A1* | 4/2002 | Kobayashi et al. .............. 709/1 |
| 2002/0129096 A1* | 9/2002 | Mansour et al. ............. 709/203 |
| 2005/0119001 A1 | 6/2005 | Watanabe |
| 2006/0258289 A1 | 11/2006 | Dua |
| 2006/0274685 A1 | 12/2006 | Johnson et al. |
| 2007/0124439 A1 | 5/2007 | Shah et al. |
| 2007/0130290 A1 | 6/2007 | Van der Winkel |
| 2007/0171936 A1 | 7/2007 | Hazra et al. |
| 2007/0248311 A1 | 10/2007 | Wice et al. |
| 2008/0074996 A1 | 3/2008 | Fourcand |
| 2008/0080430 A1* | 4/2008 | Choi et al. ................... 370/332 |
| 2008/0220788 A1 | 9/2008 | Stanwood et al. |
| 2008/0232299 A1 | 9/2008 | Mosig |
| 2009/0003620 A1 | 1/2009 | McKillop et al. |
| 2009/0024906 A1* | 1/2009 | Calderbank et al. ......... 455/41.2 |
| 2009/0061769 A1 | 3/2009 | Zimbric et al. |
| 2009/0111378 A1 | 4/2009 | Sheynman et al. |
| 2009/0154389 A1 | 6/2009 | Srikrishna et al. |
| 2009/0156122 A1 | 6/2009 | Dayan |
| 2009/0158301 A1* | 6/2009 | Holan et al. .................. 719/321 |
| 2009/0186581 A1 | 7/2009 | Griffin, Jr. et al. |
| 2009/0191914 A1 | 7/2009 | Stahl |
| 2009/0221271 A1 | 9/2009 | Soma et al. |
| 2010/0075604 A1* | 3/2010 | Lydon et al. ................. 455/41.3 |
| 2010/0159948 A1 | 6/2010 | Spivey et al. |
| 2011/0271106 A1 | 11/2011 | Hinkle et al. |
| 2011/0306301 A1 | 12/2011 | Lubetzky et al. |
| 2011/0321105 A1* | 12/2011 | Ogle et al. ...................... 725/98 |

* cited by examiner

COMMUNICATION BETWEEN A HOST DEVICE AND AN ACCESSORY USING MULTIPLE-ENDPOINT IDENTIFICATION

CROSS-REFERENCE TO RELATED APPLICATIONS

The present application is a continuation-in-part of U.S. patent application Ser. No. 12/893,719, filed Sep. 29, 2010, which claims the benefit and priority under 35 U.S.C. 119(e) from U.S. Provisional Application No. 61/387,790, filed Aug. 31, 2010. The entire disclosures of both applications are herein incorporated by reference for all purposes.

BACKGROUND

The present disclosure relates in general to host devices, such as portable media devices, that can interoperate with accessories, and in particular to interoperation of a host device with an accessory via multiple communication paths.

A portable media device generally refers to a handheld device that is capable of managing and/or playing back media assets such as audio, video, and still image files. Some portable media devices, such as the iPod®, iPhone®, and iPad® available from Apple Inc. of Cupertino, Calif., can provide users a variety of services in addition to media management and playback. Examples of such services include the storage of personal data such as calendar, contacts, and notes; Internet access; mobile telephony; and the ability to selectively download and run various application programs.

A portable media device typically includes a number of connectors or ports that can be used to interface with other devices. For instance, one connector or port can be used to establish a connection between the portable media device and a host computer for transferring data to/from the host computer. Another (or the same) connector or port can be used to establish a connection between the portable media device and an accessory device (referred to herein as an accessory) for, e.g., playing back or presenting media assets stored on the portable media device.

Some accessories are capable of interfacing with a portable media device via multiple connectors or ports of the portable media device. These accessories can be composed of a single physical device, or a number of separate physical devices that are designed to be components of a single logical device. For example, an accessory can be composed of a car head unit and a hands-free headset that are designed to be part of a single audio system. The car head unit can be capable of interfacing with a portable media device via a wired connection (e.g., 30-pin serial, USB, etc.) as well as via a wireless connection (e.g., Bluetooth). At the same time, the hands-free headset can be capable of interfacing with the portable media device via another wireless connection.

In situations such as the foregoing where an accessory can potentially interface with a portable media device via many connections, there is no protocol for informing the portable media device that the various connections to the accessory are associated (i.e., all route to the same logical accessory). The portable media device assumes that each connection (and each communication path in the connection) is separate and independent of any other. As a result, the portable media device cannot interoperate with the accessory to perform routing of information over the multiple connections/communication paths.

SUMMARY

Embodiments of the present invention provide techniques for facilitating communication between host device, such as a portable media device (PMD), and an accessory via multiple communication paths. In one set of embodiments, an accessory can be coupled with a PMD (or other host device) via a first connection, thereby establishing a first communication path. The accessory can send to the PMD, via the first communication path, a unique accessory identifier. In some embodiments the accessory can also provide information enumerating other communication paths, indicating the availability status of such paths, and/or indicating preferences as to the use of various communication paths. If the accessory subsequently connects to the PMD on another communication path, the accessory can provide its unique identifier on the other path, and the PMD can use the identifier to recognize that both communication paths are connected to the same accessory. Accordingly, an accessory can connect to a PMD using any number and combination of communication paths. Any information (e.g., identification or configuration information) provided by the accessory via the first communication path can be associated with any other communication paths that become connected, and the association can persist even if the first communication path is subsequently disconnected. For example, the PMD can continue to rely on previously-supplied identification and configuration information until such time as all communication paths to the accessory become concurrently disconnected.

When an accessory is connected on multiple communication paths, the PMD can select, based on a routing policy, one or more of the communication paths to be used for communicating particular information (e.g., data and/or control information) and can notify the accessory of the selected communication path(s). The PMD and accessory can then interoperate by exchanging signals over the selected communication path(s). In this manner, the PMD can keep track of the communication paths to the accessory and can select a particular communication path for routing information to the accessory. In some embodiments, the PMD can also dynamically update the routing as new connections are established and/or existing connections are terminated.

In some embodiments, the accessory can be coupled with the PMD via a second connection distinct from the first connection, thereby establishing a second control communication path. The accessory can send to the PMD, via the second control communication path, the same enumeration of communications paths sent over the first control communication path. In response, the PMD can compare the enumerations received over the first and second control communication paths and determine, based on the comparison, that the first and second control communication paths are connected to the same logical accessory. Alternatively, the accessory can send a unique accessory identifier via each connection as it is established, reducing the need to send enumeration information.

In certain embodiments, while interoperating with the PMD, the accessory can detect a state change that affects one or more of its data communication paths. Upon detecting such a change, the accessory can send to the PMD an updated availability status of each data communication path. In addition, while interoperating with the accessory, the PMD can determine that a data stream should be re-routed from a first data communication path to a second data communication path. Upon making such a determination, the PMD can send a notification to the accessory indicating that the second data communication path is to be used for future data communication, or the PMD can simply begin routing data using the second path.

Certain aspects of the present invention relate to methods for communicating between a host device and one or more accessories. For example, the host device can establish a first communication path with an accessory and receive a first accessory identifier via the first communication path, then establish a second communication path with an accessory (which might be the same accessory or a different accessory) and receive a second accessory identifier via the second communication path. These paths may use different transports and/or different protocols. The host can determine whether the first accessory identifier and the second accessory identifier are the same. If the first accessory identifier and the second accessory identifier are the same, the host can determine that the same accessory is connected via both the first communication path and the second communication path, and if the identifiers are not the same, the host device can determine that two different accessories are connected.

If the same accessory is connected via two (or more) communication paths, the host can select a routing path for a data stream to be sent to the accessory device, with the selection being based on respective properties of the connected communication paths. Further, if the host is sending a data stream via the first (or second) communication path and detects that the first communication path becomes closed, the host can redirect the data stream to the second (or first) communication path.

Certain aspects of the invention relate to methods for communicating between an accessory and a host device. For example, the accessory can establish a first communication path with a host device using a first transport and send an accessory identifier to the host device via the first communication path. While the first communication path remains open, the accessory can establish a second communication path with the host device using a second transport that is different from the first transport and send the same accessory identifier to the host device via the second communication path. Having the accessory send the same identifier on every connected communication path, regardless of particular transports or protocols associated with each path, can facilitate the host device recognizing when multiple communication paths with the same accessory are established. In some embodiments, the accessory can also provide preference information to the host device, to indicate a preferred usage of its available communication paths.

A further understanding of the nature and advantages of the embodiments disclosed herein can be realized by reference to the remaining portions of the specification and the attached drawings.

DETAILED DESCRIPTION

Figure 1:
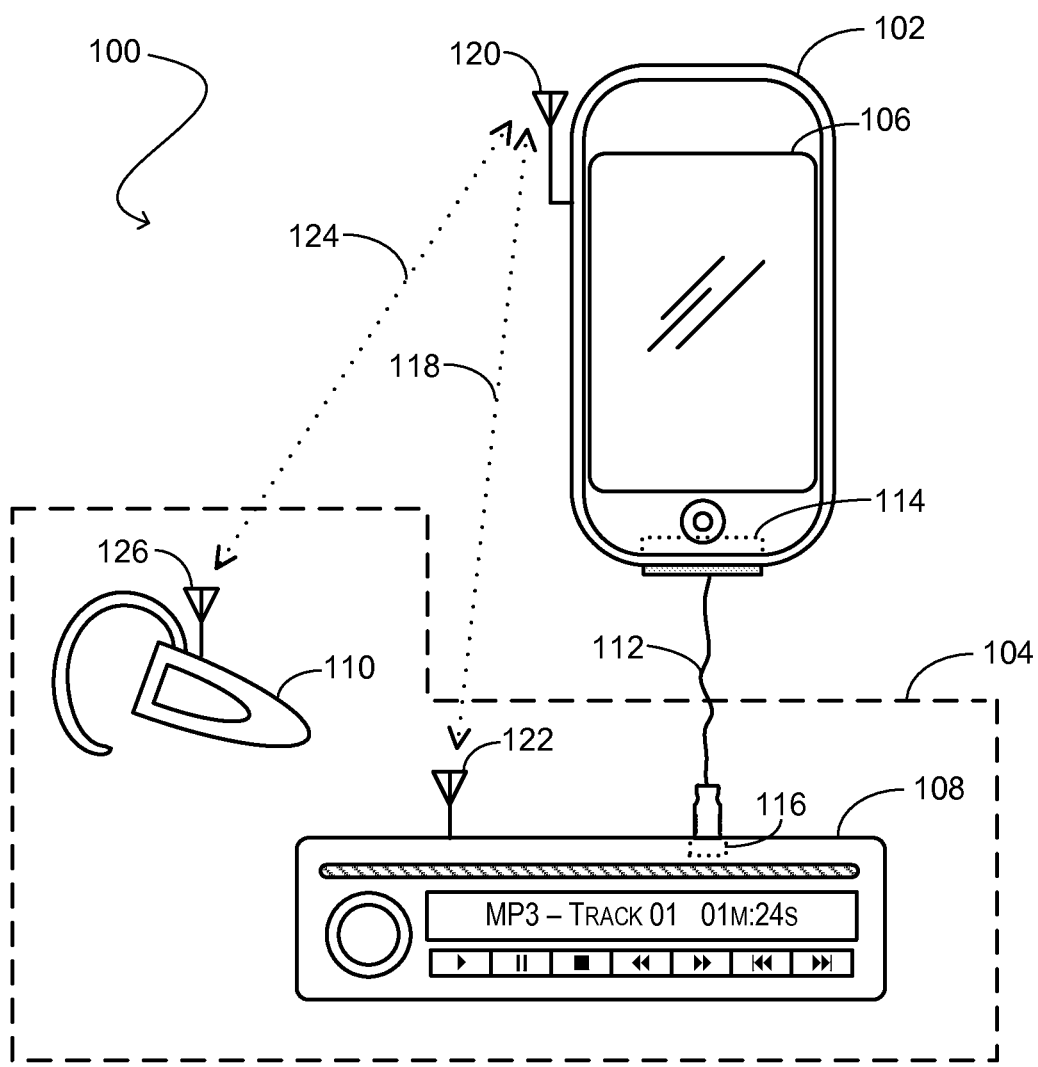
FIG. 1 is a simplified illustration of a system according to an embodiment of the present invention.

In the following description, for the purposes of explanation, numerous details are set forth in order to provide an understanding of various embodiments of the present invention. It will be apparent, however, to one skilled in the art that certain embodiments can be practiced without some of these details.

Embodiments of the present invention provide techniques for facilitating communication between host device, such as a portable media device (PMD), and an accessory via multiple communication paths. In one set of embodiments, an accessory can be coupled with a PMD (or other host device) via a first connection, thereby establishing a first communication path. The accessory can send to the PMD, via the first communication path, a unique accessory identifier. In some embodiments the accessory can also provide information enumerating other communication paths, indicating the availability status of such paths, and/or indicating preferences as to the use of various communication paths. If the accessory subsequently connects to the PMD on another communication path, the accessory can provide its unique identifier on the other path, and the PMD can use the identifier to recognize that both communication paths are connected to the same accessory. Accordingly, an accessory can connect to a PMD using any number and combination of communication paths. Any information (e.g., identification or configuration information) provided by the accessory via the first communication path can be associated with any other communication paths that become connected, and the association can persist even if the first communication path is subsequently disconnected. For example, the PMD can continue to rely on previously-supplied identification and configuration information until such time as all communication paths to the accessory become concurrently disconnected.

In some embodiments, an accessory can be coupled with a PMD (or other host device) via a first connection, thereby establishing a first control communication path. The accessory can send to the PMD, via the first control communication path, a unique accessory identifier and other information, such as an enumeration of the communication paths supported by the accessory. The enumerated communication paths can include control communication paths and data (e.g., audio or video) communication paths. The accessory can further send, to the PMD via the first control communication path, an availability status of each data communication path. If the accessory subsequently connects to the PMD on another communication path, the accessory can provide its unique identifier on the other path, and the PMD can use the identifier to recognize that both communication paths are connected to the same accessory. Accordingly, an accessory can connect to a PMD using any number and combination of communication paths. Any information (e.g., identification or configuration information) provided by the accessory via the first communication path can be associated with any other communication paths that become connected, and the association can persist even if the first communication path is subsequently disconnected; for example, the PMD can continue to rely on previously-supplied identification and configuration information until such time as all communication paths to the accessory become concurrently disconnected.

When an accessory is connected on multiple communication paths, the PMD can select, based on a routing policy, one or more of the communication paths to be used for communicating particular information (e.g., data and/or control information) and can notify the accessory of the selected communication path(s). The PMD and accessory can then interoperate by exchanging signals over the selected communication path(s). In this manner, the PMD can keep track of the communication paths to the accessory and can select a particular communication path for routing information to the accessory. In some embodiments, the PMD can also dynamically update the routing as new connections are established and/or existing connections are terminated.

In some embodiments, the accessory can be coupled with the PMD via a second connection distinct from the first connection, thereby establishing a second control communication path. The accessory can send to the PMD, via the second control communication path, the same enumeration of communications paths sent over the first control communication path. In response, the PMD can compare the enumerations received over the first and second control communication paths and determine, based on the comparison, that the first and second control communication paths are connected to the same logical accessory. Alternatively, the accessory can send a unique accessory identifier via each connection as it is established, reducing the need to send enumeration information.

In certain embodiments, while interoperating with the PMD, the accessory can detect a state change that affects one or more of its data communication paths. Upon detecting such a change, the accessory can send to the PMD an updated availability status of each data communication path. In addition, while interoperating with the accessory, the PMD can determine that a data stream should be re-routed from a first data communication path to a second data communication path. Upon making such a determination, the PMD can send a notification to the accessory indicating that the second data communication path is to be used for future data communication, or the PMD can simply begin routing data using the second path.

FIG. 1 is a simplified illustration of a system 100 according to an embodiment of the present invention. As shown, system 100 can include a portable media device (PMD) 102 and an accessory 104. PMD 102, which is an example of a host device, can be any handheld device that is capable of storing and playing back digital media assets such as audio, video, and/or still image files. In a particular embodiment, PMD 102 can be an iPod®, iPhone®, or iPad® (available from Apple Inc. of Cupertino, Calif.). PMD 102 can include a user interface comprising user input and/or output devices such as touch-screen display 106. PMD 102 can also include any number of other user input and/or output devices such as scroll wheels, buttons, keyboards, trackballs, touchpads, microphones, speakers, and the like.

PMD 102 can provide a variety of services to a user, such as the management and playback of media assets, mobile telephony and Internet access (e.g., via wireless connections such as Wi-Fi and/or wireless data networks using EDGE, 3G, or 4G technology), and execution of various application programs that can be installed on PMD 102 by the user. In certain embodiments, PMD 102 can provide one or more services that entail the transmission of control and/or data signals to an accessory such as accessory 104.

Accessory 104 can be any type of electronic device that is capable of communicating with PMD 102. In one set of embodiments, accessory 104 can be composed of separate physical devices (e.g., a car head unit 108 and a hands-free headset 110) that are designed to be components of a single logical device. For example, car head unit 108 can be designed to interoperate with headset 110 as part of a single audio system when both are connected to PMD 102. Similarly, headset 110 can be designed to interoperate with car head unit 108 as part of a single audio system when both are connected to PMD 102. In alternative embodiments, accessory 104 can be composed of a single physical device.

As shown in FIG. 1, accessory 104 can interface with PMD 102 via multiple connections. For example, car head unit 108 can interface with PMD via a wired connection 112 (e.g., serial, USB, etc.) between a media device connector 114 of PMD 102 and an accessory connector 116 of car head unit 108, as well as via a wireless connection 118 (e.g., Bluetooth) between a wireless port/antenna 120 of PMD 102 and a wireless port/antenna 122 of car head unit 108. In addition, headset 110 can interface with PMD 102 via another wireless connection 124 between wireless port/antenna 120 of PMD 102 and a wireless port/antenna 126 of headset 110. Although only three connections are depicted between accessory 104 and PMD 102, any number of connections can be supported.

Each connection 112, 118, 124 can include one or more control and/or data communication paths between accessory 104 and PMD 102. As used herein, a control communication path is a signaling path that can carry commands or messages for controlling a device such as PMD 102 or accessory 104, providing state information, and so on. A data communication path is a signaling path that can carry digital and/or analog data signals such as audio, video, and the like. In some instances, the same communication path can be used for both data and control signals.

It is desirable that, when PMD 102 and accessory 104 are coupled via multiple connections as shown in FIG. 1, PMD 102 should be able to determine that connections 112, 118, 124 all connect to the same accessory. By recognizing when multiple connections are available to the same accessory, PMD 102 can interoperate with accessory 104 in a manner that includes intelligent routing of data and/or control signals over one or more of the connections.

For example, consider a situation where car head unit 108 has initially established a first audio communication path and a control communication path to PMD 102 via wired connection 112, such that audio data from PMD 102 is sent to car head unit 108 over the first audio communication path and control signals from car head unit 108 (e.g., play, pause, fast forward, etc.) are sent to PMD 102 over the control communication path. If headset 110 subsequently establishes a second audio communication path with PMD 102 via wireless connection 124, it may be desirable to automatically re-route the audio data from the first audio communication path to the second audio communication path, while allowing car head unit 108 to continue to control PMD 102 via the control communication path. Further, if the second audio communication path subsequently becomes unavailable (e.g., headset 110 is turned off), it may be desirable to automatically re-route the audio data back to the first audio communication path. This type of intelligent routing can be supported if PMD 102 is aware that the various control/audio communication paths between PMD 102, car head unit 108, and headset 110 are part of the same logical system.

Accordingly, embodiments of the present invention enable accessory 104 (e.g., car head unit 108 and headset 110) to provide to PMD 102 information indicating all of its supported communication paths and information indicating when a new path becomes connected. For instance, upon establishing a control communication path to PMD 102 via wired connection 112, car head unit 108 can provide a unique accessory identifier, defined such that the same identifier is associated with all components of accessory 104. Car head unit 108 can also provide other information, such as an enumeration of all of the possible control and data communication paths to accessory 104 over connections 112, 118, and 124. Car head unit 108 can also indicate to PMD 102 the availability status of each data communication path. Based on this information, PMD 102 can associate the various communication paths with accessory 104 and make informed decisions about how to route data to car head unit 108 or headset 110.

If headset 110 subsequently connects to PMD 102 via wireless connection 124, headset 110 can send to PMD 102 the same enumeration information sent by car head unit 108. In response, PMD 102 can recognize that the enumerated communication paths for headset 110 and car head unit 108 are the same, and thus can determine that the two devices are part of the same logical accessory. Alternatively, headset 110 can send to PMD 102 the unique accessory identifier for accessory 104 or other information that identifies the headset as being part of the same logical accessory as car head unit 108. Specific processing that can be performed by PMD 102 and accessory 104 to achieve this functionality is described in greater detail with reference to FIGS. 3-14 below.

It should be appreciated that system 100 is illustrative and not intended to limit embodiments of the present invention. For example, a variety of different types of PMDs and accessories can be used. One of ordinary skill in the art will recognize many variations, modifications, and alternatives.

Figure 2:
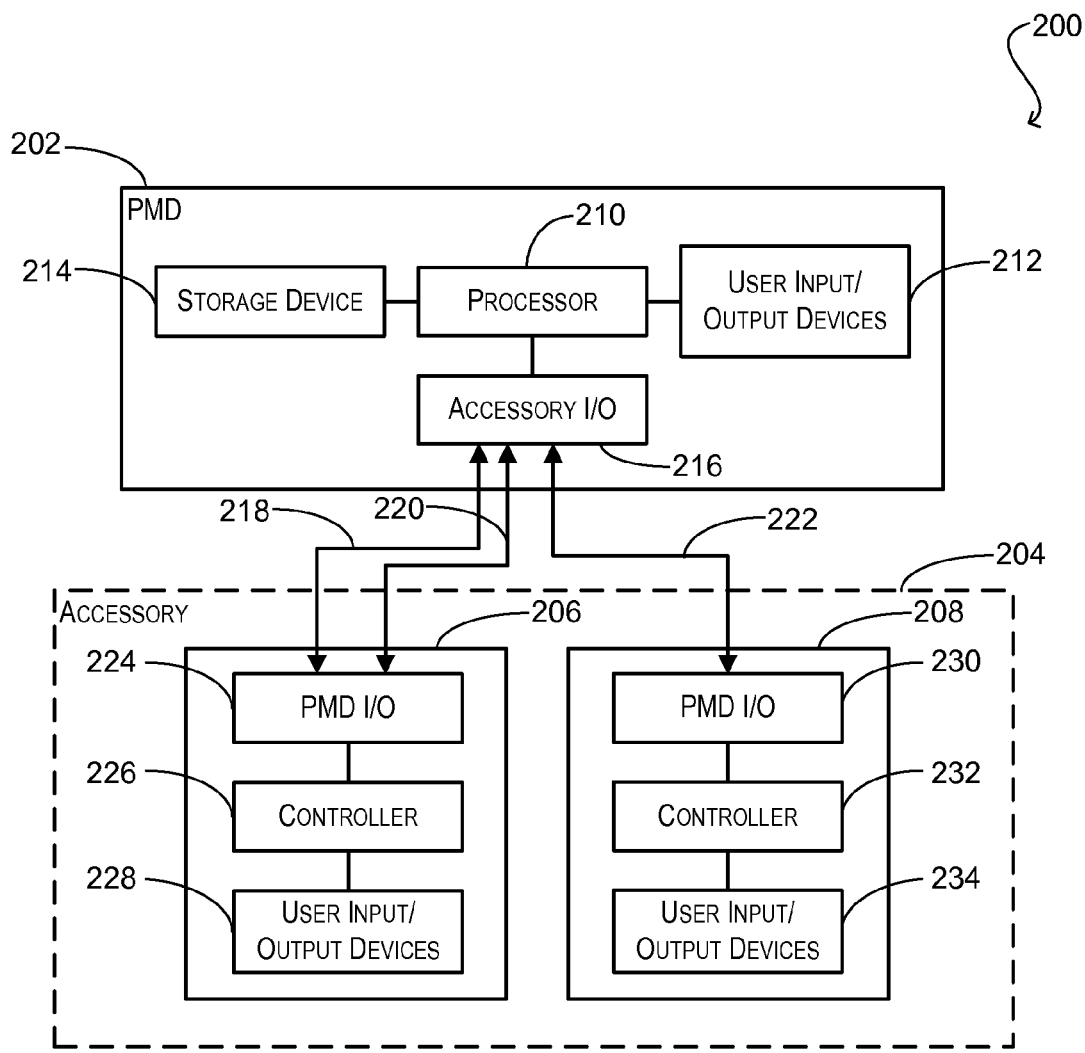
FIG. 2 is a simplified block diagram of a system according to an embodiment of the present invention.

FIG. 2 is a simplified block diagram of a system 200 according to an embodiment of the present invention. As shown, system 200 can include a PMD 202 and an accessory 204 composed of a first device 206 and a second device 208. In one set of embodiments, system 200 can implement system 100 of FIG. 1. For example, PMD 202 can implement PMD 102, accessory 204 can implement accessory 104, device 206 can implement car head unit 108, and device 208 can implement headset 110.

PMD 202, which is an example of a host device, can include a processor 210, user input/output devices 212, a storage device 214, and an accessory I/O (input/output) interface 216.

Processor 210 can be implemented as one or more integrated circuits, such as a microprocessor or microcontroller. In a particular embodiment, processor 210 can be a microprocessor that uses the ARM architecture (a RISC architecture designed by ARM Limited). Processor 210 can be responsible for carrying out one or more operations of PMD 202. For example, processor 210 can select and play media assets or execute various application programs stored in storage device 214. Processor 210 can also manage communication with accessories (e.g., accessory 204) via accessory I/O interface 216.

User input/output devices 212 can be any of a number of devices that allow a user to interact with PMD 202. For example, as discussed with respect to PMD 102 of FIG. 1, such user input/output devices can include scroll wheels, buttons, keyboards, trackballs, microphones, speakers, touch-screen displays, and so on. In various embodiments, the user can operate a particular user input device 212 to invoke the functionality of PMD 202. In addition, a user can view and/or hear output from PMD 202 via a particular user output device 212.

Storage device 214 can be implemented, for example, using magnetic disk, flash memory, and/or any other non-volatile storage medium. In some embodiments, storage device 214 can include non-removable storage components such as a non-removable hard disk drive or flash memory drive and/or removable storage media such as flash memory cards. Storage device 214 can provide storage for any programs and/or data used by PMD 202. For example, storage device 214 can store media assets such as audio, video, still images, or the like, and associated metadata (e.g., asset name, artist, title, genre, playlists, etc.). Storage device 214 can also store information other than media assets, such as information about a user's contacts (names, addresses, phone numbers, etc.); scheduled appointments and events; notes; and/or other personal information. Storage device 214 can also store one or more programs to be executed by processor 210, such as operating system programs, video game programs, personal information management programs, programs for playing media assets and/or navigating a media asset database, and so on.

Accessory I/O interface 216 can include a number of signal paths configured to carry various signals between PMD 202 and accessory 204. In one set of embodiments, accessory I/O interface 216 can include a wired interface such as a multi-pin connector as used on various iPod®, iPhone®, and iPad® products. Alternatively or additionally, accessory I/O interface 216 can include a wireless interface (e.g., Bluetooth or the like). In certain embodiments, accessory I/O interface 216 can support multiple concurrent connections between PMD 202 and accessory 204. For example, as shown in FIG. 2, device 206 of accessory 204 can connect to accessory I/O interface 216 via connections 218 and 220, and device 208 of accessory 204 can connect to accessory I/O interface 216 via connection 222. Although only three connections are depicted, any number of connections can be supported.

Like accessory 104 of FIG. 1, accessory 204 can be composed of separate physical devices (device 206 and 208) that are designed to act in concert as a single logical device. Alternatively, accessory 204 can be composed of a single physical device that provides multiple endpoints for communication with PMD 202. Each device of accessory 204 can include a controller 226/232, a PMD I/O interface 224/230, and user input/output devices 228/234.

Controllers 226, 232 can be implemented as one or more integrated circuits, such as a microprocessor or microcontroller. In various embodiments, controllers 226, 232 can control the operation of corresponding devices 206, 208. Controllers 226, 232 can also manage communication with PMD 202 via PMD I/O interfaces 224, 230.

User input/output devices 228, 234 can be any of a number of devices that allow a user to interact with accessory 204. Such user input/output devices can include scroll wheels, buttons, keyboards, trackballs, microphones, speakers, touch-screen displays, and so on. In various embodiments, the user can view and/or hear output from PMD 202 that is routed to device 206 or 208 via a particular user output device 228, 234.

Each PMD I/O interface 224/230 can include a number of signal paths configured to carry various signals between device 206/208 and PMD 202. In one set of embodiments, PMD I/O interface 224/230 can include a wired interface such as a multi-pin connector as used in various iPod®, iPhone®, and iPad® products. Alternatively or additionally, PMD I/O interface 224/230 can include a wireless interface (e.g., Bluetooth or the like).

In various embodiments, PMD I/O interface 224/230 and accessory I/O interface 216 can allow various communication paths, or channels, to be connected (open) or disconnected (closed) and can thereby allow accessory 204 and PMD 202 to be in a "connected" or "disconnected" state. As used herein, accessory 204 and PMD 202 are connected whenever at least one communication path between PMD I/O interface 224/230 and accessory I/O interface 216 is open (or connected). Conversely, accessory 204 and PMD 202 are disconnected whenever all communication paths are closed (or disconnected). Connection can be achieved by physical attachment (e.g., between respective mating connectors of accessory 204 and PMD 202), by an indirect connection such as a cable, or by establishment of a wireless connection. Similarly, disconnection can be achieved by physical detachment, disconnecting a cable, powering down accessory 204 or PMD 202, or closing the wireless connection.

A variety of communication paths can be connected between PMD I/O interface 224/230 and accessory I/O interface 216, including wired communication paths using transports and protocols such as USB, FireWire, or universal asynchronous receiver/transmitter ("UART"), and wireless communication paths using transports such as Bluetooth, WiFi, infrared, or the like. As noted above, in certain embodiments multiple communication paths (e.g., 218, 220, 222) can be established concurrently between accessory 204 and PMD 202, where each connection includes one or more control communication paths and/or data communication paths for exchanging control and/or data signals.

It should be appreciated that system 200 is illustrative and not intended to limit embodiments of the present invention. For example, PMD 202 and accessory 204 may each have other capabilities or include other components that are not specifically described. Further, PMD 202 is representative of a class of host devices that in various embodiments can provide computing, communication, and/or media capabilities. Host devices can be implemented in a variety of form factors ranging from small handheld devices (e.g., phone, PDA, portable media player) to larger handheld devices (e.g., tablet computer) to laptop or desktop computer systems, and so on. Similarly, accessory 204 is representative of a range of different accessories that can interoperate with a host device to provide various enhanced functionality, such as media playback (e.g., using a display and/or speakers of the accessory), audio or video capture (e.g., using a camera or microphone of the accessory), remote data storage, remote control of the host device by the accessory or of the accessory by the host device, and so on. One of ordinary skill in the art will recognize many variations, modifications, and alternatives.

In some embodiments, PMD 202 and accessory 204 can communicate via at least one of the communication paths by exchanging messages (e.g., including commands and associated data) according to an accessory protocol. An example of such a protocol is the iPod® Accessory Protocol (iAP) developed by Apple Inc.

The accessory protocol can define a "universe" of recognized control messages that can be transmitted between a host device (e.g., PMD 202) and an accessory (e.g., accessory 204). The message format can include, e.g., a start bit or bit sequence to indicate that what follows is a message code, followed by an actual message code that can be interpreted and acted on by the recipient. In some embodiments, the message code or message can be referred to as a "command." Some message codes (or commands) can instruct the receiving device to perform some operation. Other message codes (or commands) can indicate that the message is providing a particular type of information (e.g., data; event notifications) without specifying an action to be taken by the receiving device. At least some of the message codes may have one or more associated parameters or data items defined by the protocol, and a message can include values for any such parameters or data items in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated), while the payload provides all or part of the message data. The packet can also include error-detection or error-correction codes as known in the art.

In some embodiments, the messages can be logically grouped into a "general" message set and an "optional" message set. Every accessory and every host device that use the accessory protocol can be required to support at least the general message set. This message set can include messages enabling the host device and the accessory to identify and authenticate themselves to each other and to provide information about the functionality that they support. For example, the general message set can include a message the accessory can send to the host device to enumerate its available communication paths, a message the accessory can send to the host device to provide a unique accessory identifier, messages related to establishing and/or terminating connections on a particular communication path, and so on. The general message set can also include authentication messages that the host device can use to verify the purported identity and capabilities of the accessory (or vice versa), and the accessory (or host device) may be blocked from invoking certain (or all) of the optional messages if the authentication is unsuccessful.

The optional message set can include messages related to various functionality that might or might not be supported by a given accessory. For example, the optional message set can include simple remote messages that allow an accessory to identify a function of the host device to be invoked, remote user interface messages that can be used to obtain information related to replicating all or part of a user interface of a host device on an accessory (thereby supporting a more advanced remote control), messages that allow a user to control a radio tuner in an accessory by operating a host device and/or to control a radio tuner in a host device by operating an accessory, messages that facilitate transfers of data objects between the host device and the accessory, and so on. Any combination of optional messages can be defined in an accessory protocol, and there is no requirement that a given accessory or host device support all (or even any) of the optional messages.

It should be appreciated that the accessory protocol described above is illustrative and not intended to limit embodiments of the present invention. For example, the set of defined messages can be varied, and a single message can incorporate multiple items of information. For instance, in some embodiments, the accessory can send enumeration information for all of its communication paths in a single message; in other embodiments, a separate message is used to enumerate each path. Further, some of the messages (e.g., optional messages as described above) may not be supported by particular host devices or accessories. One of ordinary skill in the art will recognize many variations, modifications, and alternatives.

Further it should be appreciated that the phrases "sending a command" (or "sending a message") and "receiving a command" (or receiving a message") can be interpreted broadly to include any exchange of commands or other messages. Thus, while the terms "command" and "message" are sometimes used for a low-level atomic transaction, they can also be used to refer to high-level operations that include multiple low-level commands or messages.

In some embodiments, an accessory capable of communicating with PMD 202 is required to support the accessory protocol using at least one of its communication paths as a transport but is not required to support the accessory protocol on all of its communication paths or transports. For example, accessory 204 might support the accessory protocol on communication path 218 but not on communication path 220 or 222. PMD 202 can require that the first connection to a particular accessory 204 be established on a communication path that supports the accessory protocol, to facilitate authentication of accessory 204 and enumeration of other communication paths.

In other embodiments, use of an accessory protocol is not required on any communication path. As described below, PMD 202 can interoperate with an accessory without having all of the possible communication paths enumerated in advance. As long as accessory 204 sends the same identifier each time a communication path is established, PMD 202 can dynamically develop a model of the various communication paths that are available for communicating with accessory 204.

As described above, embodiments of the present invention provide techniques for facilitating communication between a portable media device (e.g., PMD 202 of FIG. 2) and an accessory (e.g., accessory 204 of FIG. 2) via multiple communication paths. In some embodiments, an accessory can send to a PMD an enumeration of the control and data communication paths supported by the accessory. The accessory can further send to the PMD an availability status of each data communication path. In response, the PMD can select, based on a routing policy, one or more of the data communication paths, and the PMD and accessory can interoperate by exchanging data signals over the selected data communication path. In this manner, the PMD can keep track of the communication paths to the accessory and can select a particular data communication path for routing data to the accessory.

Figure 3:
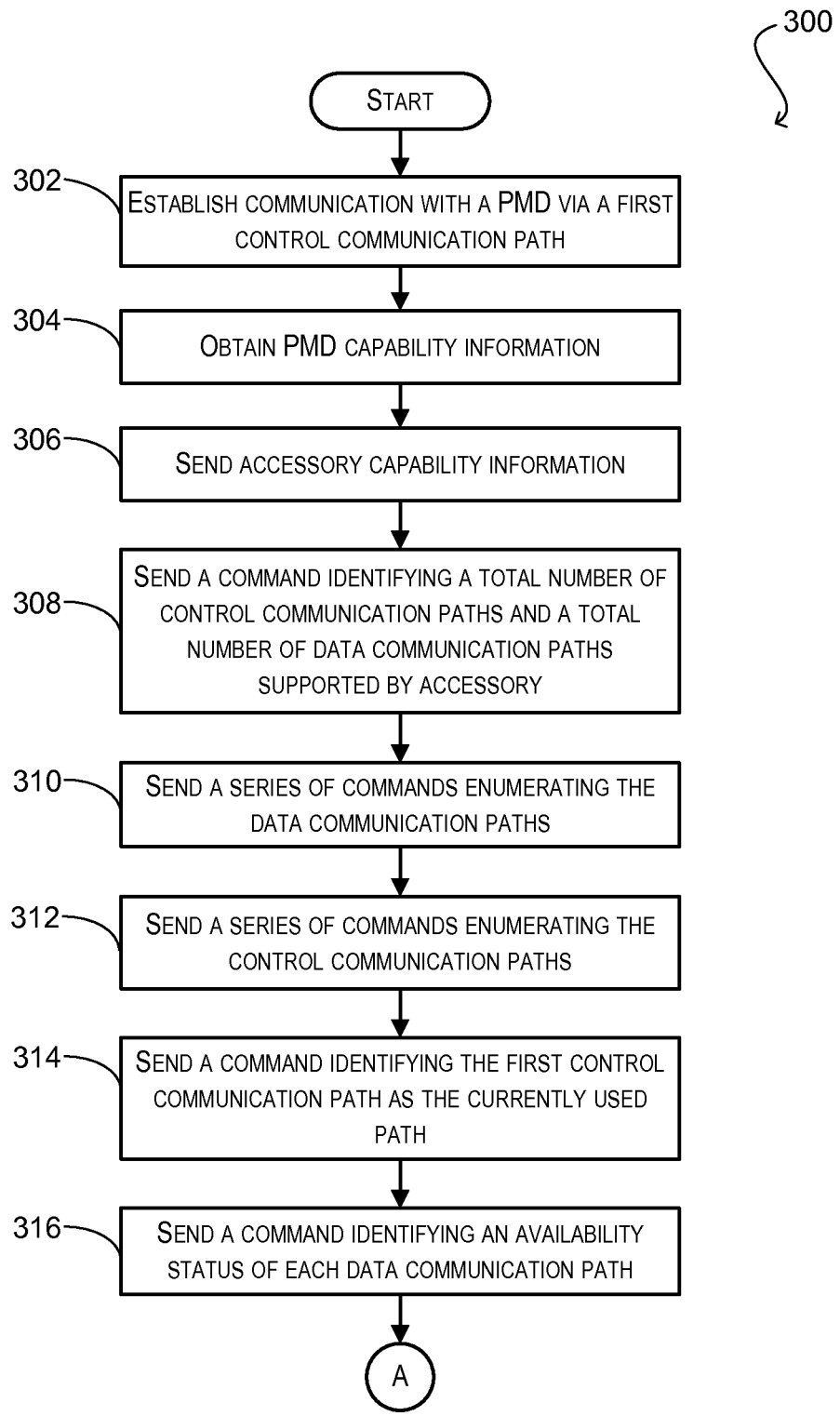
FIG. 3 is a flow diagram of a process performed by an accessory upon connecting to a portable media device via a first connection according to an embodiment of the present invention

FIG. 3 is a flow diagram of a process 300 that can be performed by accessory 204 upon connecting to PMD 202 (or another host device) via a first connection according to an embodiment of the present invention. In a particular embodiment, process 300 can be performed by accessory 204 as part of an initialization sequence prior to engaging in normal operation with PMD 202. Process 300 can be implemented by accessory 204 in hardware, software, or a combination thereof. As software, process 300 can be encoded as program code stored on a machine-readable storage medium.

At block 302, accessory 204 can connect to PMD 202 via a first connection (e.g. connection 218, 220, or 222) and thereby establish a first control communication path with PMD 202. In some embodiments, this can include identifying and/or authenticating PMD 202 using general messages of the accessory communication protocol described above. Since accessory 204 of FIG. 2 is composed of separate physical devices 206 and 208, block 302 (as well as any other process step described herein as being attributable to accessory 204) can be performed by either device 206 or 208 of accessory 204.

At block 304, accessory 204 can obtain, via the first control communication path, capability information from PMD 202. For example, accessory 204 can obtain information indicating whether PMD 202 supports routing of data over multiple communication paths. In some embodiments, process 300 can be aborted by accessory 204 if PMD 202 does not have this specific capability.

In response to receiving the capability information at block 302, accessory 204 can send, via the first control communication path, its own capability information to PMD 202 (block 306). For example, accessory 204 can send information indicating that it supports routing of data over multiple communication paths. This information can also include a unique identifier for the accessory, as described below.

At block 308, accessory 204 can send, via the first control communication path, a command (or message) indicating the total number of control communication paths and the total number of data communication paths supported by the accessory. In other words, this command can quantify all of the control communication paths and data communication paths accessory 204 can potentially use for communicating with PMD 202. With respect to system 200 of FIG. 2, these totals would include the communication paths included in connections 218, 220, and 222. Thus, e.g., if each of 218, 220, and 222 includes one control communication path and two data communication paths, the total number of control communication paths supported by accessory 204 would be three and the total number of data communication paths supported by accessory 204 would be six.

In certain embodiments, the command sent at block 308 can also include information indicating a predefined class for accessory 204 (e.g., speaker, headset, microphone, display, etc.).

At block 310, accessory 204 can send, via the first control communication path, a series of commands (or one or more messages) to PMD 202 enumerating the data communication paths that it is designed to support. For example, accessory 204 can send one command for each data communication path, where the command includes a predetermined numerical index for the path. In other embodiments, accessory 204 can send a single message to PMD 202 that includes descriptors for all of the communication paths that accessory 204 supports.

In one set of embodiments, the enumeration can begin at zero and increment up by one for each data communication path. In other embodiments, the enumeration can begin at any number and can be incremented by any value. In certain embodiments, this enumeration can be stored by accessory 204 and used for future communications with PMD 202. For example, accessory 204 can use the index of each data communication path to provide an availability status of the path to PMD 202, as well as to receive information from PMD 202 regarding the currently used path (described in further detail below).

In addition to a numerical index, the message or series of commands sent at block 310 can also include other information pertaining to each data communication path. As one example, the series of commands can include a human-readable name for each path (e.g., for display to a user of PMD 202 or accessory 204). As another example, the series of commands can include an identifier that is unique to the accessory or to the connection associated with each path. For wired connections, the identifier can be based on, e.g., an authentication ID serial number assigned to the accessory. For wireless connections, the identifier can be based on, e.g., a MAC address of a Bluetooth or WiFi port of the accessory.

As yet another example, the message or series of commands can include audio and/or video-related settings for each data communication path. For instances, if a particular path is an audio path, the command for that path can include fields specifying the type of the audio path (e.g., line in, line out, USB audio out from PMD, USB audio in to PMD, A2DP out, HFP, etc.), whether auto-play should be enabled, whether the audio path supports volume control, the sample rates supported by the audio path, and the like. If a particular path is a video path, the command for that path can include fields specifying the type of the video path (e.g., DisplayPort, HDMI, etc.), the resolutions/video timings supported by the video path, the color depths supported by the video path, and the like.

Once accessory 204 has enumerated its data communication paths, accessory 204 can send, via the first control communication path, a series of commands enumerating its control communication paths (block 312). For example, accessory 204 can send one command for each control communication path, where the command includes a predetermined numerical index for the path. Like the enumeration of data communication paths, the enumeration of the control communication paths can begin at zero and increment up by one for each control communication path. In other embodiments, the enumeration can begin at any number and can be incremented by any value. In certain embodiments, this enumeration can be stored by accessory 204 and used for future communications with PMD 202.

In some embodiments, the series of commands sent at block 312 can further include, for each control communication path, a type of the path (e.g., USB, serial, Bluetooth, etc.) and an identifier that is unique to the accessory or to the connection associated with the path. For wired connections, the identifier can be based on, e.g., an authentication ID serial number assigned to the accessory. For wireless connections, the identifier can be based on, e.g., a MAC address of a Bluetooth or WiFi port of the accessory.

In one set of embodiments, all control communication paths can be considered broadcast paths. In these embodiments, a control signal sent by accessory 204 to PMD 202 (or vice versa) on a particular control communication path will act on the receiving device as a whole, and will not be confined to a specific connection or data communication path. In alternative embodiments, a control communication path can be linked to a data communication path, such that a control signal received on the control communication path will only affect the data stream being routed through the data communication path.

At block 314, accessory 204 can send, via the first control communication path, a command to PMD 202 identifying the control path it is currently communicating over (i.e., the first control communication path). In one set of embodiments, accessory 204 can reference the current control communication path based on the index enumerated at block 312.

At block 316, accessory 204 can send, via the first control communication path, a command to PMD 202 indicating an availability status of each data communication path. In this manner, PMD 202 can be made aware of which data communication paths are available for routing data to accessory 204. In one set of embodiments, accessory 204 can reference each data communication path based on the index enumerated at block 310.

In some embodiments, this command can also include an indication of whether one or more data communication paths are preferred by the accessory. PMD 202 can take this preference into account when making routing decisions.

Subsequently to block 316 (which, in certain embodiments, marks the end of the initialization process between accessory 204 and PMD 202), accessory 204 can receive a selection of a particular data communication path from PMD 202, and the PMD and accessory can interoperate by exchanging data signals over the selected data communication path. This further processing performed by accessory 204 (denoted by the "A" designator) is discussed with respect to FIG. 11 below.

It should be appreciated that process 300 is illustrative and that variations and modifications are possible. For example, although block 316 describes sending a command indicating the availability status (and "preferred" status) for each data communication path, a similar command can be sent that indicates the availability status (and "preferred" status) for each control communication path. As another example, in some embodiments the accessory can send a single message that includes a descriptor of each of the supported communication paths. The descriptor can include any or all of the information described above, including whether the communication path is operable for data and/or control signals, accessory preferences as to use of particular paths, and so on. Further, steps described as sequential may be executed in parallel, order of steps may be varied, and steps may be modified, combined, added, or omitted. One of ordinary skill in the art will recognize many variations, modifications, and alternatives.

Figure 4:
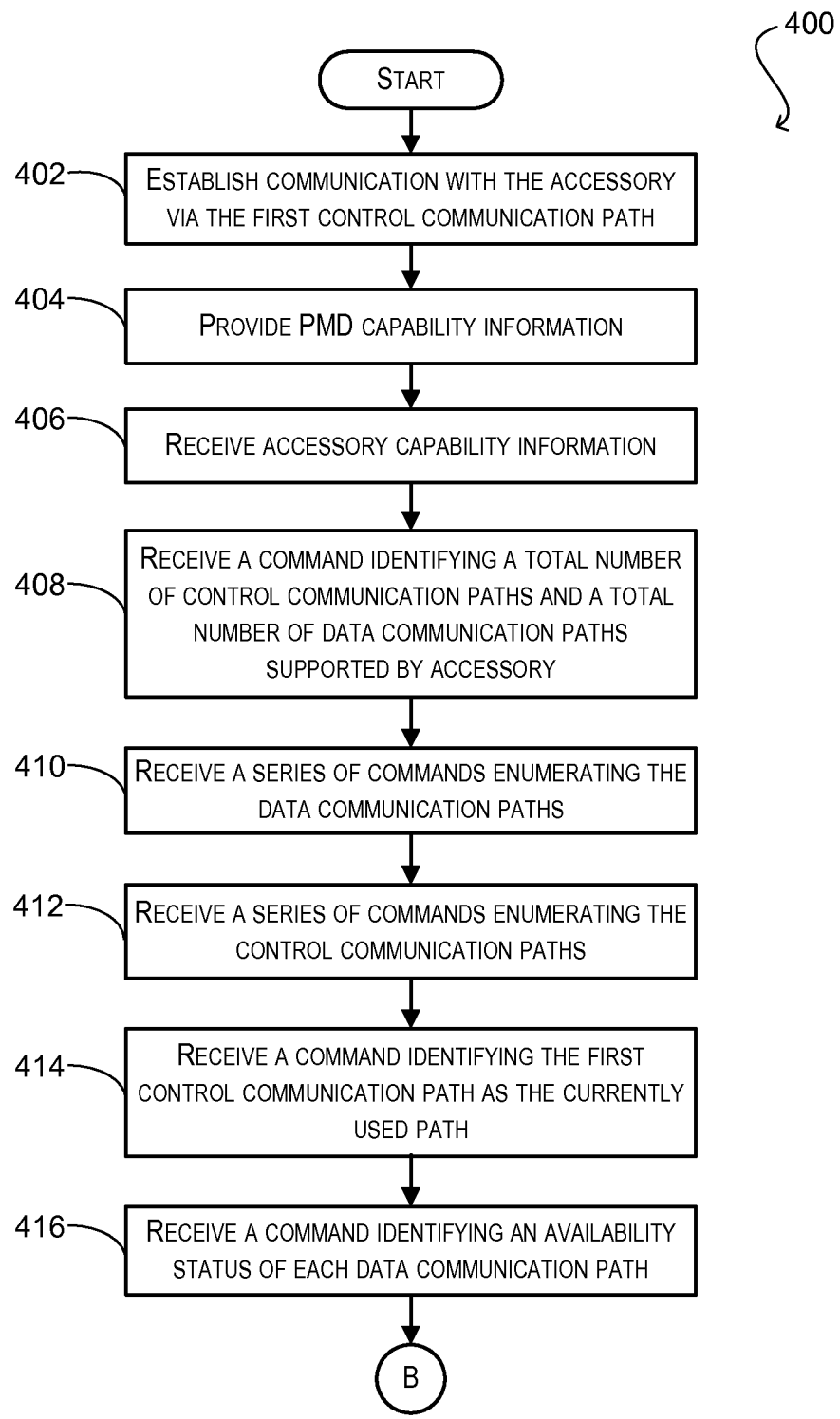
FIG. 4 is a flow diagram of a process performed by a portable media device upon connecting to an accessory via a first connection according to an embodiment of the present invention.

FIG. 4 is a flow diagram of a process 400 that can be performed by PMD 202 (or another host device) upon connecting to accessory 204 via a first connection according to an embodiment of the present invention. In one set of embodiments, process 400 can be performed by PMD 202 while process 300 is being performed by accessory 204. In a particular embodiment, process 400 can be performed by PMD 202 as part of an initialization sequence prior to engaging in normal operation with accessory 204. Process 400 can be implemented by PMD 202 in hardware, software, or a combination thereof. As software, process 400 can be encoded as program code stored on a machine-readable storage medium.

At block 402, PMD 202 can connect to accessory 204 via a first connection (e.g. connection 218, 220, or 222) and thereby establish a first control communication path with accessory 204. In one set of embodiments, this can include identifying and/or authenticating accessory 204 using general messages of the accessory communication protocol described above.

At block 404, PMD 202 can provide, via the first control communication path, capability information to accessory 204. For example, PMD 202 can provide information indicating whether its supports routing of data over multiple communication paths. Further, PMD 202 receive, via the first control communication path, capability information from accessory 204 (block 406). For example, accessory 204 can send information indicating whether it supports routing of data over multiple communication paths. In some embodiments, process 400 can be aborted if accessory 204 does not have this specific capability. The received information can also include a unique identifier for the accessory, e.g., as described below.

At block 408, PMD 202 can receive, via the first control communication path, a command (or message) indicating the total number of control communication paths and the total number of data communication paths supported by accessory 204. In one set of embodiments, this command can correspond to the command sent by accessory 204 at block 308.

At blocks 410 and 412, PMD 202 can receive, via the first control communication path, commands (or messages) enumerating the data communication paths and the control communication paths supported by accessory 204. In one set of embodiments, these commands can correspond to the commands sent by accessory 204 at blocks 310 and 312. In a particular embodiment, these enumerations can be stored by PMD 202 and used for future communications with accessory 204. For example, PMD 202 can use the enumerated index of each data communication path to provide information to accessory 204 regarding the currently used path (described in further detail below). In some embodiments, PMD 202 can receive a single message that includes descriptors for each communication path.

At block 414, PMD 202 can receive, via the first control communication path, a command from accessory 204 indicating the currently used control path. In one set of embodiments, this command can correspond to the command sent by accessory 204 at block 314.

At block 416, PMD 202 can receive, via the first control communication path, a command from accessory 204 indicating an availability status (as well as a preferred status) of each data communication path. In one set of embodiments, this command can correspond to the command sent by accessory 204 at block 316. In various embodiments, PMD 202 can use this information to make decisions on how to route data to accessory 204 during normal accessory operation. For example, PMD 202 can consult a routing policy and select an available data communication path for routing data to accessory 204. The PMD and accessory can then interoperate by exchanging data signals over the selected data communication path. This further processing performed by PMD 202 (denoted by the "B" designator) is discussed with respect to FIG. 12 below.

It should be appreciated that process 400 is illustrative and that variations and modifications are possible. For example, steps described as sequential may be executed in parallel, order of steps may be varied, and steps may be modified, combined, added, or omitted. One of ordinary skill in the art will recognize many variations, modifications, and alternatives.

In some embodiments, accessory 204 can provide a unique accessory identifier to PMD 202. The accessory identifier can be, e.g., a numeric, alphanumeric, or other identifier that reliably distinguishes accessory 204 from any other accessory that might connect to PMD 202. For example, in some embodiments, the identifier can include an accessory manufacturer name, model name, and serial number. In some embodiments, the identifier can include a function (e.g., a hash function) computed from a representation of the manufacturer name, model name and/or serial number. In some embodiments, a manufacturer of a line of PMDs can define a namespace of accessory identifier codes and assign a different subset of the namespace to each accessory manufacturer. The accessory manufacture can assign specific codes within its allocated subset of the namespace to specific accessories.

Figure 5:
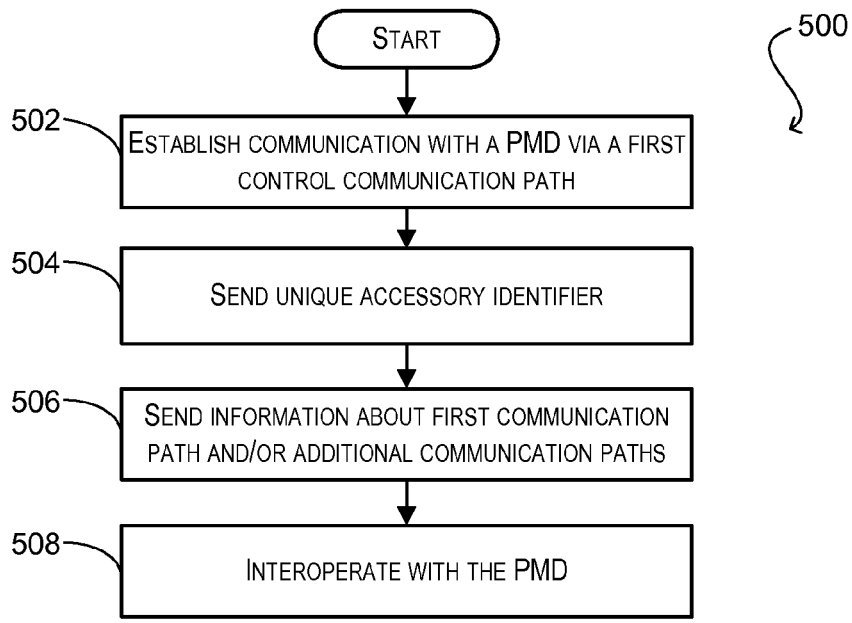
FIG. 5 is a flow diagram of a process that can be performed by an accessory upon initially connecting to a PMD according to an embodiment of the present invention.

FIG. 5 is a flow diagram of a process 500 that can be performed by an accessory (e.g., accessory 204) upon initially connecting to a host device (e.g., PMD 202) according to an embodiment of the present invention. Process 500 can be implemented by accessory 204 in hardware, software, or a combination thereof. As software, process 500 can be encoded as program code stored on a machine-readable storage medium. Process 500 can be similar to process 300 described above.

At block 502, accessory 204 can establish communication with PMD 202 via a first connection (e.g., connection 218, 220, or 222) and thereby establish a first communication path with PMD 202. As with process 300, it should be understood that where accessory 204 incorporates separate physical devices 206, 208, the first communication path can be established by either physical device. In some embodiments, the first communication path can support an accessory communication protocol (e.g., as described above), and block 502 can include performing authentication to establish that accessory 204 is authorized to communicate with PMD 202. In some embodiments, if accessory 204 does not successfully authenticate, process 500 can be terminated.

At block 504, accessory 204 can send its unique accessory identifier to PMD 202 via the first communication path. In embodiments where the first communication path supports the accessory protocol, the identifier can be sent in a message conforming to the accessory protocol. For other types of communication paths, including communication paths that do not support the accessory protocol, other mechanisms can be used. For example, standard communication protocols such as USB and Bluetooth provide mechanisms for the exchange of vendor-specific information between connected devices. In some embodiments of the present invention, the unique accessory identifier can be provided as vendor-specific information associated with the vendor of the PMD and/or the vendor of the accessory as desired.

At block 506, accessory 204 can send additional information to PMD 202, including information about the first communication path and/or other communication paths supported by accessory 204. For example, any or all of the information sent at blocks 308-316 of FIG. 3 can be sent, e.g., using one or more messages conforming to the accessory communication protocol. In some embodiments, accessory 204 is not required to provide any advance enumeration of other paths; PMD 202 can recognize additional connections to the same accessory based on the accessory identifier; examples are described below.

At block 508, accessory 204 can begin to interoperate with PMD 202. Interoperation can include exchanging data and/or control commands or messages; any type of interaction supported by the protocol in use on the first communication path can be performed. In some instances, interoperation can also include establishing additional communication paths; examples are described below.

Figure 6:
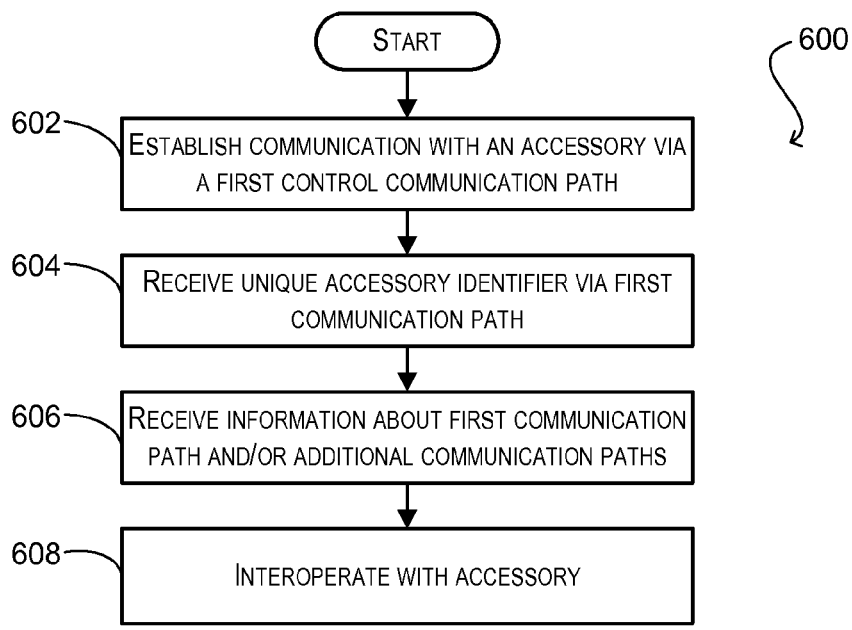
FIG. 6 is a flow diagram of a process that can be performed by a PMD upon initially connecting to an accessory according to an embodiment of the present invention.

FIG. 6 is a flow diagram of a process 600 that can be performed by a host device (e.g., PMD 202) upon initially connecting to an accessory (e.g., accessory 204) according to an embodiment of the present invention. Process 600 can be implemented by PMD 202 in hardware, software, or a combination thereof. As software, process 600 can be encoded as program code stored on a machine-readable storage medium. Process 600 can be similar to process 400 described above.

At block 602, PMD 202 can establish communication with accessory 204 via a first connection (e.g., connection 218, 220, or 222) and thereby establish a first communication path with accessory 204. As with process 400, it should be understood that where accessory 204 incorporates separate physical devices 206, 208, the first communication path can be established with either physical device. In some embodiments, the first communication path can support an accessory communication protocol (e.g., as described above), and block 602 can include performing authentication to establish that accessory 204 is authorized to communicate with PMD 202. In some embodiments, if accessory 204 does not successfully authenticate, PMD 202 can terminate process 600.

At block 604, PMD 202 can receive a unique accessory identifier from accessory 204 via the first communication path. This can be the same as the identifier sent at block 504 of process 500 described above. In embodiments where the first communication path supports the accessory protocol, the identifier can be sent in a message conforming to the accessory protocol. For other types of communication paths, including communication paths that do not support the accessory protocol, other mechanisms can be used. For example, standard communication protocols such as USB and Bluetooth provide mechanisms for the exchange of vendor-specific information between connected devices. In some embodiments of the present invention, the unique accessory identifier can be provided as vendor-specific information associated with the vendor of the PMD and/or the vendor of the accessory as desired.

At block 606, PMD 202 can receive additional information from accessory 204, including information about the first communication path and/or other communication paths supported by accessory 404. For example, any or all of the information received at blocks 408-416 of FIG. 4 can be received, e.g., as one or more messages conforming to the accessory communication protocol. In some embodiments, accessory 204 is not required to provide any advance enumeration of other paths; PMD 202 can recognize additional connections to the same accessory based on the accessory identifier; examples are described below.

At block 608, PMD 202 can begin to interoperate with accessory 204. Interoperation can include exchanging data and/or control commands or messages; any type of interaction supported by the protocol in use on the first communication path can be performed. In some instances, interoperation can also include establishing additional communication paths; examples are described below.

It will be appreciated that processes 500 and 600 are illustrative and that variations and modifications are possible. Steps described as sequential may be executed in parallel, order of steps may be varied, and steps may be modified, combined, added or omitted.

After PMD 202 and accessory 204 begin to interoperate using the first communication path (e.g., after execution of processes 300 and 400 or processes 500 and 600), additional paths can be established. In some embodiments, accessory 204 establishes the additional path, and PMD 202 can recognize that the additional path is connected to the same accessory 204. For example, in some embodiments, accessory 204 can send the same path enumeration information upon establishing each additional path, and PMD 202 can determine whether the same accessory 204 established each path by comparing the enumeration information received via the various paths. In other embodiments, accessory 204 can send the same unique accessory identifier upon establishing each additional path, and PMD 202 can determine whether the same accessory 204 established each path by comparing the accessory identifiers received via the various paths.

Figure 7:
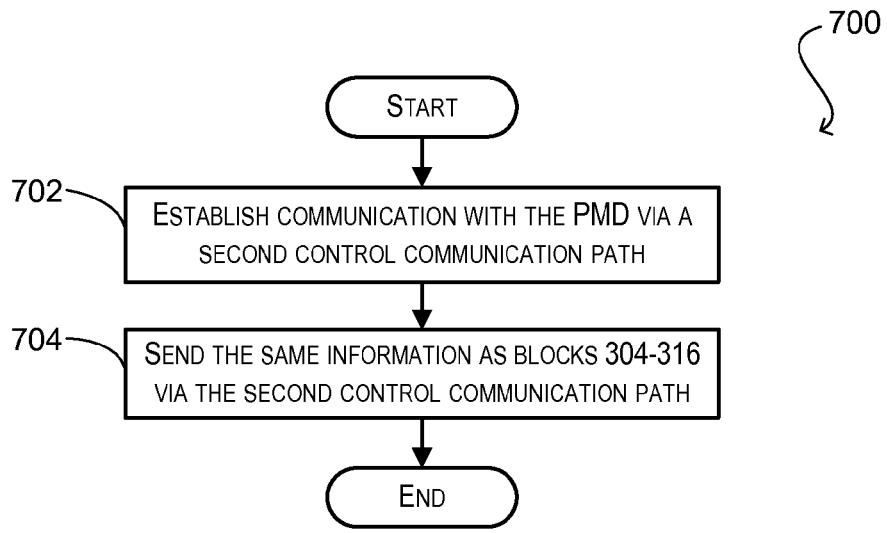
FIG. 7 is a flow diagram of a process performed by an accessory upon connecting to a portable media device via a second connection according to an embodiment of the present invention.

FIG. 7 is a flow diagram of a process 700 that can be performed by accessory 204 upon connecting to PMD 202 (or another host device) via a second connection according to an embodiment of the present invention. In one set of embodiments, process 700 can be performed by accessory 204 after it has already connected to PMD 202 via a first connection per process 300 of FIG. 3. Process 700 can be implemented by accessory 204 in hardware, software, or a combination thereof. As software, process 700 can be encoded as program code stored on a machine-readable storage medium.

At block 702, accessory 204 can connect to PMD 202 via a second connection that is distinct from the first connection made at block 302. For example, if accessory 204 previously connected to PMD 202 via connection 218, accessory 204 can connect to PMD 202 via connection 220 or 222. In this scenario, accessory 204 can establish a second control communication path to PMD 202 (as well as zero or more additional data communication paths).

At block 704, accessory 204 can send, via the second control communication path, the same (or substantially the same) information that was sent over the first control communication path at blocks 304-316 of FIG. 3. For example, accessory 204 can send the same enumeration of data and control communication paths sent at blocks 310 and 312. In various embodiments, this enables PMD 202 to identify the second connection/control communication path as being connected to the same logical accessory as the first connection/control communication path.

In alternative embodiments, accessory 204 can send, via the second control communication path, some other information that associates the second control communication path with the first control communication path. For example, accessory 204 can send a identifier that matches a identifier sent over the first control communication path via the command(s) of block 312. In these embodiments, PMD 202 can compare the identifiers sent over the two control communication paths and determine that they are connected to the same logical accessory. One of ordinary skill in the art will recognize many variations, modifications, and alternatives.

Figure 8:
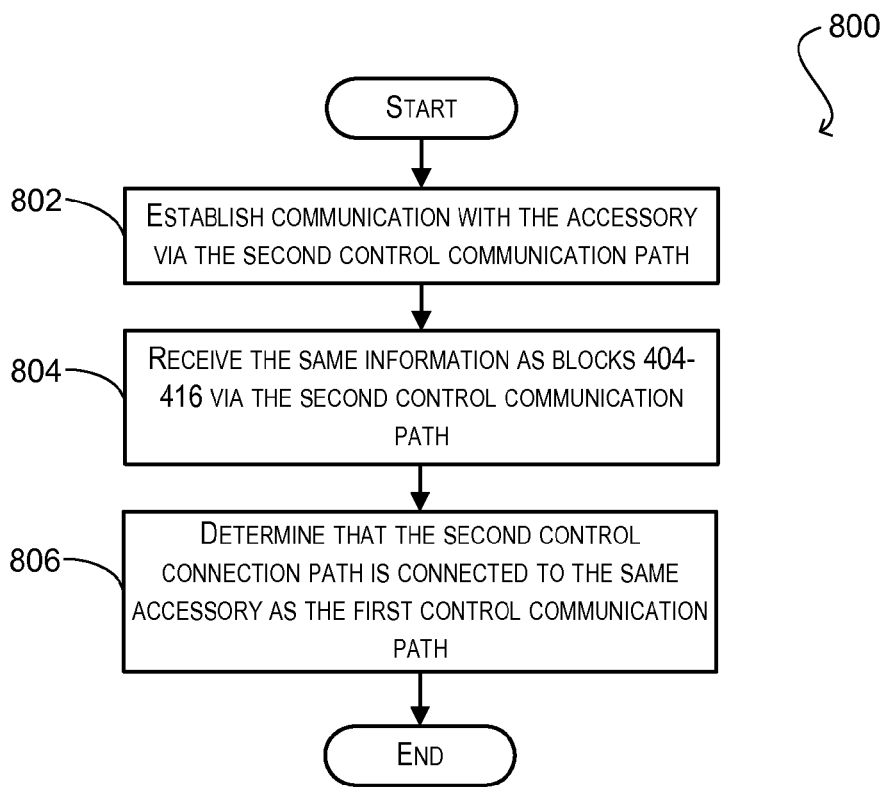
FIG. 8 is a flow diagram of a process performed by a portable media device upon connecting to an accessory via a second connection according to an embodiment of the present invention.

FIG. 8 is a flow diagram of a process 800 that can be performed by PMD 202 (or another host device) upon connecting to accessory 204 via a second connection according to an embodiment of the present invention. In one set of embodiments, process 800 can be performed by PMD 202 while process 700 is being performed by accessory 204. Process 800 can be implemented by PMD 202 in hardware, software, or a combination thereof. As software, process 800 can be encoded as program code stored on a machine-readable storage medium.

At block 802, PMD 202 can connect to accessory 204 via a second connection that is distinct from the first connection made at block 302. This block can be complementary to block 702.

At block 804, PMD 202 can receive, via the second communication path, the same (or substantially the same) information that was received over the first communication path at blocks 404-416 of FIG. 4. For example, PMD 202 can receive the same enumeration of data and control communication paths received at blocks 410 and 412.

At block 806, PMD 202 can compare the enumeration information received at block 804 with the enumeration information received at blocks 410 and 412. Based on that comparison, PMD 202 can determine whether or not the second control connection path is connected to the same accessory (i.e., accessory 204) as the first control communication path. For example, if the enumerated data and control communication paths are exactly the same, PMD 202 can assume that a single logical accessory is reporting this information over two separate control paths. In this manner, PMD 202 can keep track of all of the communication paths that are connected to the same logical accessory.

It should be appreciated that processes 700 and 800 are illustrative and that variations and modifications are possible. For example, steps described as sequential may be executed in parallel, order of steps may be varied, and steps may be modified, combined, added, or omitted. One of ordinary skill in the art will recognize many variations, modifications, and alternatives.

Figure 9:
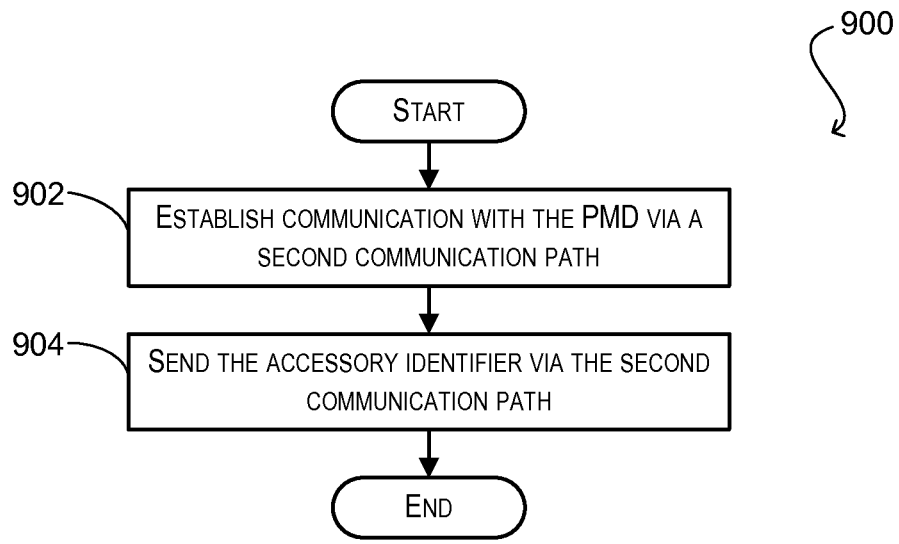
FIG. 9 is a flow diagram of a process that can be performed by an accessory upon connecting to a PMD via a second connection according to an embodiment of the present invention.

As noted above, in some embodiments, an accessory identifier can be used to facilitate determining whether a new communication path is connected to the same accessory as an existing communication path. FIG. 9 is a flow diagram of a process 900 that can be performed by an accessory (e.g., accessory 204 of FIG. 2) upon connecting to a host device (e.g., PMD 202 of FIG. 2) via a second connection according to an embodiment of the present invention. In some embodiments, process 900 can be performed by accessory 204 while it is connected to PMD 202 via a first connection; the first connection can be established, e.g., according to process 500 of FIG. 5. Process 900 can be implemented by accessory 204 in hardware, software, or a combination thereof. As software, process 900 can be encoded as program code stored on a machine-readable storage medium At block 902, accessory 204 can establish a connection with PMD 202 using a second communication path. The second communication path can be any communication path that is distinguishable by the PMD and the accessory from the first communication path. For example, the first and second communication paths can use different transports and/or different protocols. In some embodiments, the first and second communication paths can be connected to physically or logically distinct components of the accessory while using the same transport (e.g., a wireless transport such as Bluetooth) and protocol.

At block 904, accessory 204 can send its unique accessory identifier via the second communication path. This identifier is recognizable by PMD 202 as matching the unique accessory identifier that was sent via the first communication path at block 504 of FIG. 5, described above, allowing PMD 202 to determine that the first and second communication paths are both connected to accessory 204. It should be understood that other identifying information can also be sent.

Figure 10:
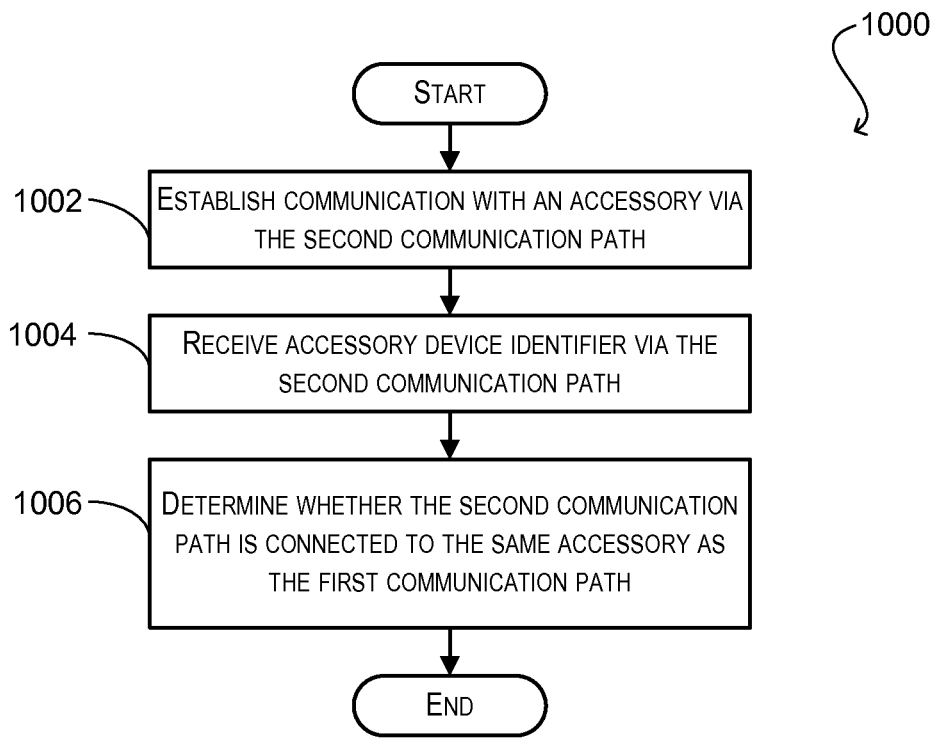
FIG. 10 is a flow diagram of a process that can be performed by a PMD upon connecting to an accessory via a second connection according to an embodiment of the present invention.

FIG. 10 is a flow diagram of a process 1000 that can be performed by a PMD (e.g., PMD 202 of FIG. 2) upon connecting to an accessory (e.g., accessory 204 of FIG. 2) via a second connection according to an embodiment of the present invention. In some embodiments, process 1000 can be performed by PMD 202 while it is connected to accessory 204 via a first connection; the first connection can be established, e.g., according to process 600 of FIG. 6. Process 1000 can be implemented by PMD 202 in hardware, software, or a combination thereof. As software, process 1000 can be encoded as program code stored on a machine-readable storage medium.

At block 1002, PMD 202 can establish a connection with accessory 204 using a second communication path. The second communication path can be any communication path that is distinguishable by the PMD and the accessory from the first communication path. For example, the first and second communication paths can use different transports and/or different protocols. In some embodiments, the first and second communication paths can be connected to physically or logically distinct components of the accessory while using the same transport (e.g., a wireless transport such as Bluetooth) and protocol.

At block 1004, PMD 202 can receive the unique accessory identifier of accessory 204 via the second communication path. It should be understood that other identifying information can also be received.

At block 1006, PMD 202 determines that the second communication path is connected to the same accessory as the first communication path. For example, PMD 202 can determine that the unique accessory identifier received at block 1004 matches the unique accessory identifier that was received via the first communication path at block 604 of FIG. 6, described above.

It will be appreciated that process 900 and 1000 are illustrative and that variations and modifications are possible. Steps described as sequential may be executed in parallel, order of steps may be varied, and steps may be modified, combined, added or omitted. In some embodiments, the second communication path does not need to implement the accessory protocol, and PMD 202 can apply any accessory identifying information, authentication information, capability information, and/or configuration information that was received via the first communication path to the accessory connected on the second communication path.

Further, using processes 500 and 600 in conjunction with processes 900 and 1000, it is not necessary that any of the communication paths support a particular protocol. As long as the accessory provides the same accessory identifier on each connected communication path, the PMD can determine whether the same accessory is connected based on whether the identifiers received via different communication paths match.

It will also be appreciated that the same mechanism can operate in the reverse direction to allow an accessory to determine whether it has multiple communication paths connected to the same PMD or to different PMDs. For example, each time a connection is established, the PMD can send a unique PMD identifier to the connected accessory; as long as the PMD sends the same identifier on each communication path, the accessory can determine whether multiple paths are connected to the same PMD.

Figure 11:
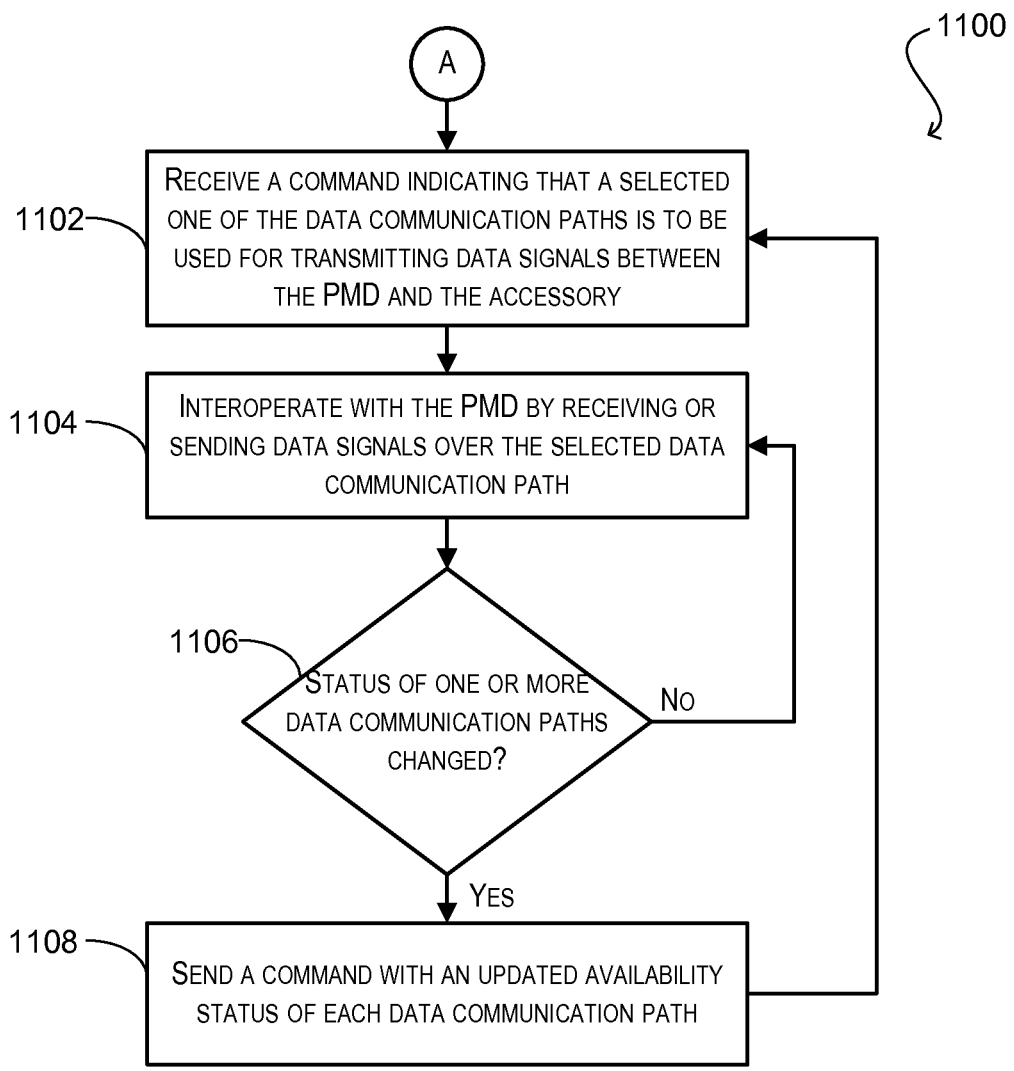
FIG. 11 is a flow diagram of a process performed by an accessory while interoperating with a portable media device according to an embodiment of the present invention.

FIG. 11 is a flow diagram of a process 1100 that can be performed by accessory 204 while interoperating with PMD 202 (or other host device) according to an embodiment of the present invention. In one set of embodiments, process 1100 can be a continuation of process 300, and can be performed by accessory 204 after it has completed the initialization process of process 300. Process 1100 can be implemented by accessory 204 in hardware, software, or a combination thereof. As software, process 1100 can be encoded as program code stored on a machine-readable storage medium.

At block 1102, accessory 204 can receive a command from PMD 202 indicating that a selected one (or more) of the data communication paths is to be used for exchanging data signals (e.g., audio, video, etc.) between the accessory and the PMD. For example, with respect to the embodiment of FIG. 2, the command can indicate that an audio communication path included in connection 218 will be used for routing an audio stream from PMD 202 to accessory 204. In one embodiment, the command can reference the selected path by the enumeration index provided at block 310 of FIG. 3.

In some embodiments, the command received at block 1102 can identify only the selected path. In other embodiments, the command can include references to all of the data communication paths, with a particular value assigned to the selected path to specify its selected status. In a particular embodiment, the command can identify multiple data communication paths as active paths for exchanging data signals between accessory 204 and PMD 202.

At block 1104, accessory 204 can interoperate with PMD 202 by receiving and/or sending data signals over the selected data communication path.

While the accessory and PMD are interoperating, accessory 204 can detect whether the availability status of one or more communication paths has changed (block 1106). For example, accessory 204 may detect that connection 218 has failed or otherwise become unavailable (e.g., disconnected, etc.). If such a change is detected, accessory 204 can send a command to PMD 202 that is similar to the command sent at block 316 and that includes an updated availability status of each data communication path. In this manner, PMD 202 can be kept up-to-date of the status of all communication paths and can make routing decisions accordingly. For example, if a data communication path included in connection 218 was previously being used and subsequently becomes unavailable, PMD 202 can select a new data connection path for routing data to accessory 204 and can inform accessory 204 of the newly selected path. The PMD and accessory can then act in synchronization with respect to the newly selected path.

Process 1100 can continue indefinitely until, for example, PMD 202 and accessory 204 become completely disconnected, or until PMD 202 closes the application that requires interoperation with accessory 204.

It should be appreciated that process 1100 is illustrative and that variations and modifications are possible. For example, although process 1100 describes the routing of data signals over one or more selected data communication paths, process 1100 can be easily adapted to route control signals over one or more selected control communication paths between accessory 204 and PMD 202. Further, steps described as sequential may be executed in parallel, order of steps may be varied, and steps may be modified, combined, added, or omitted. One of ordinary skill in the art will recognize many variations, modifications, and alternatives.

Figure 12:
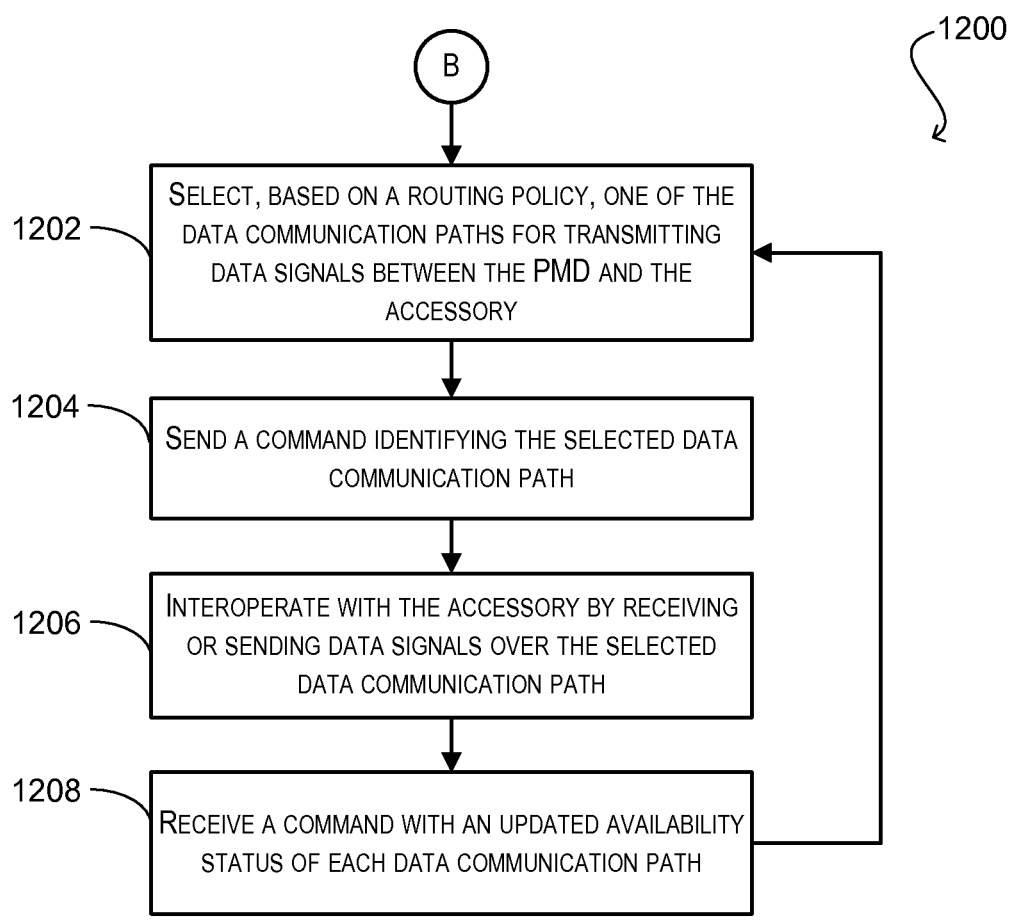
FIG. 12 is a flow diagram of a process performed by a portable media device while interoperating with an accessory according to an embodiment of the present invention.

FIG. 12 is a flow diagram of a process 1200 that can be performed by PMD 202 (or another host device) while interoperating with accessory 204 according to an embodiment of the present invention. In one set of embodiments, process 1200 can be a continuation of process 400, and can be performed by PMD 202 after it has completed the initialization process of process 400. In a particular embodiment, process 1200 can be performed by PMD 202 while process 1100 is being performed by accessory 204. Process 1200 can be implemented by PMD 202 in hardware, software, or a combination thereof. As software, process 1200 can be encoded as program code stored on a machine-readable storage medium.

At block 1202, PMD 202 can select, based on a routing policy, one or more of the data communication paths enumerated at block 410 of FIG. 4 for routing data signals (e.g., audio, video, etc.) to/from accessory 204. In one set of embodiments, this selection can take into account the current availability status of each data communication path and whether or not a particular path is preferred by the accessory.

At block 1204, PMD 202 can send a command to accessory 204 identifying the selected data communication path. In one set of embodiments, this command can correspond to the command received by the accessory at block 1102 of FIG. 11.

Once PMD 202 has selected a data communication path, PMD 202 and accessory 204 can interoperate by exchanging data signals over the selected path (block 1206). If the status of one of the data communication paths changes, PMD 202 can receive a command from accessory 204 indicating an updated availability status of each path (block 1208). In one set of embodiments, this command can correspond to the command sent by accessory 204 at block 1108. PMD 202 can then, e.g., select a new data communication path, or continue interoperating with accessory 204 using the currently selected path. Process 1200 can continue indefinitely until, for example, PMD 202 and accessory 204 become completely disconnected, or until PMD 202 closes the application that requires interoperation with accessory 204.

It should be appreciated that process 1200 is illustrative and that variations and modifications are possible. For example, steps described as sequential may be executed in parallel, order of steps may be varied, and steps may be modified, combined, added, or omitted. One of ordinary skill in the art will recognize many variations, modifications, and alternatives.

Using the processes described above, a PMD and an accessory can establish concurrent connections on multiple communication paths. In some embodiments, a PMD can have concurrent connections to the same accessory or to multiple accessories. Any number of concurrent connections can be supported. Upper limits on the number of concurrent connections and/or the number of concurrently-connected accessories are matters of design choice, e.g., the number of physical and/or virtual ports that are designed into a particular PMD can be chosen based on intended usage scenarios and other design decisions regarding system resources.

Figure 13:
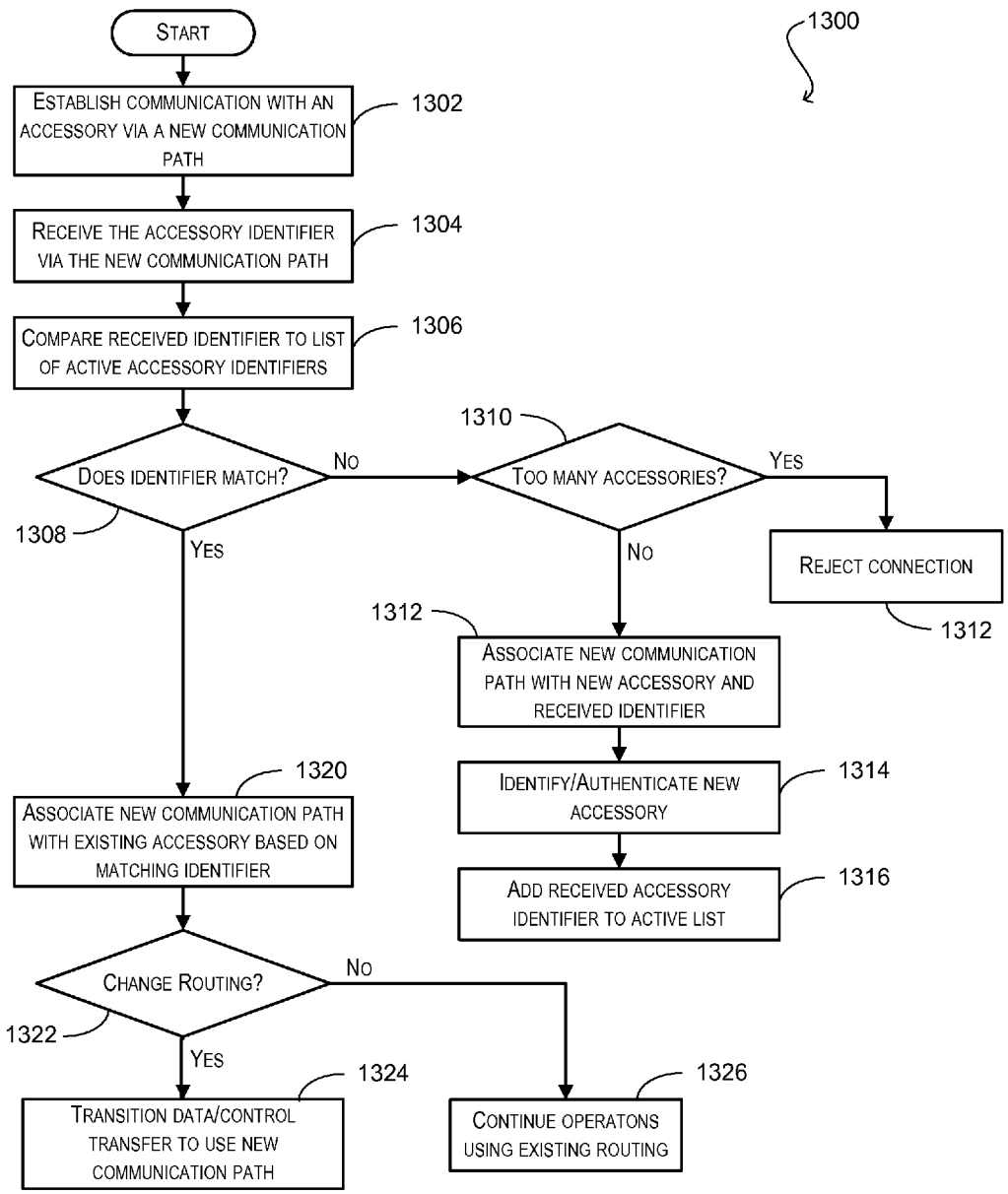
FIG. 13 is a flow diagram of a process for managing multiple connections according to an embodiment of the present invention.

FIG. 13 is a flow diagram of a process 1300 for managing multiple connections according to an embodiment of the present invention. Process 1300 can be performed by a host device, e.g., PMD 202 of FIG. 2 and can be invoked whenever a new connection is established. Process 1300 can be implemented by PMD 202 in hardware, software, or a combination thereof. As software, process 1300 can be encoded as program code stored on a machine-readable storage medium.

Process 1300 can begin at block 1302, when PMD 202 establishes communication with an accessory via a new communication path. At block 1304, PMD 202 can receive an accessory identifier via the new communication path. At block 1306, PMD 202 can compare the received identifier to a list of active accessory identifiers. The list of active accessory identifiers can include an identifier of each accessory that is currently connected to PMD 202 via at least one communication path. Initially, this list is empty; identifiers can be added as connections are established, as described below.

At block 1308, PMD 202 can determine whether the received accessory identifier matches an accessory identifier on the list of active accessory identifiers. If not, then at block 1310, PMD 202 can determine whether an upper limit on the number of concurrently connected accessories has been reached. As noted above, this limit is a matter of design choice and can be, e.g., 1, 2, 4 or any other number of accessories. If the upper limit has been reached, then the new connection can be rejected at block 1312. When rejecting the connection, PMD 202 can send a notification message to the accessory indicating the rejection and in some embodiments the reason for rejection. In some embodiments, PMD 202 can present an alert message to a user when a connection is refused, in addition to or instead of notifying the accessory; this message can indicate the rejection and in some embodiments the reason for rejection.

If, at block 1310, the upper limit has not been reached, then at block 1312, PMD 202 can associate the new communication path with a new accessory and the received accessory identifier. At block 1314, PMD 202 can identify and authenticate the new accessory. This can be generally similar to processes for establishing a first connection described above with reference to FIGS. 3-6. At block 1316, PMD 202 can add the received identifier for the new connection to the list of active accessory identifiers. Any identification or authentication information received from the accessory can also become associated with the accessory identifier. In some embodiments, block 1316 can also include incrementing a counter of connected accessories, to facilitate determining when the upper limit is reached.

Referring again to block 1308, if the received accessory identifier matches an accessory identifier on the list of active accessory identifiers, then at block 1320, PMD 202 can associate the new communication path with an active (i.e., already connected) accessory, based on the matching identifier. This can be generally similar to processes for establishing a second connection described above with reference to FIGS. 7-10. In some embodiments, there can be an upper limit on the number of concurrent connections to a single accessory (e.g., 2, 4, 8 or any other number of communication paths), and if this limit is reached, the new connection can be rejected. In this instance, the accessory would remain connected on any previously established communication paths.

Assuming the new connection is allowed, then at block 1322, PMD 202 can determine whether routing of existing data and/or control communications should be changed. As described above, PMD 202 can implement a routing policy to determine how communications of various types should be routed. The policy can depend on the availability of various communication paths. Consequently, if a new communication path becomes available, the policy may indicate that the new path should be used.

For example, it is possible to stream audio data using a variety of transports and protocols, such as USB and Bluetooth. Due to differences in bandwidth (and resulting audio quality) associated with these protocols, a USB communication path may be preferable when it is available. Thus, the routing policy may provide that if a USB communication path to a particular accessory is established while audio is being routed via Bluetooth to that accessory, the audio should be rerouted via the USB communication path.

As another example, a PMD and an accessory can exchange various combinations of data and control signals. If, at a time when a first communication path is in use for both data and control signals, a second communication path becomes available, it may be desirable to continue routing the control signals via the first communication path while changing the routing of the data to use the second communication path. Or, depending on the particular paths, it may be desirable to continue to route data via the first communication path while changing the routing of the control signals to use the second communication path.

In some embodiments, the routing policy may also take into account user preferences and/or accessory preferences. For example, as described above, the accessory can provide routing preference information using an identification message (or command), and the routing policy of the PMD can take into account routing preferences indicated by the accessory. Some PMDs can provide a user interface, e.g., a Settings menu, via which the user can indicate preferences for data routing, such as preferring wired connections when available or indicating whether to optimize performance or power consumption or other criteria. In some embodiments, PMD 202 can prompt the user when a new communication path with an accessory is established and allow the user to indicate whether data routing should be changed. Other embodiments allow PMD 202 to dynamically reroute signals without user intervention.

If, at block 1322, PMD 202 determines that the routing should be changed, then at block 1324, PMD 202 can execute a transition to the new communication path. The transition can include notifying the accessory of the new routing; for example, processes 1100 and 1200, or similar processes, can be used. If, at block 1322, the routing should not be changed, then at block 1326, PMD 202 can continue operations using the existing routing.

It should be understood that routing changes do not need to be applied immediately upon determining that routing should be changed. For example, if PMD 202 is streaming audio to be output by the accessory in real time, it may not be possible to transition the audio routing to a new communication path without causing an audible pause or other glitch in the output. Accordingly, PMD 202 can wait to change the audio routing until a time when audible artifacts of the transition will be minimal (e.g., between tracks on a playlist). As another example, if PMD 202 is receiving a data object from accessory 204 on a first communication path, it may be more convenient to continue to use that path until the data-object transfer is complete, then use the second communication path for transfer of any subsequent data objects.

Just as new communication paths can be established at any time, an established communication path can be terminated at any time. If the communication path that is terminated is not in use, PMD 202 can simply update its connection and routing information. If a communication path is terminated while it is in use, PMD 202 can provide a smooth transition to another communication path if one remains available.

Figure 14:
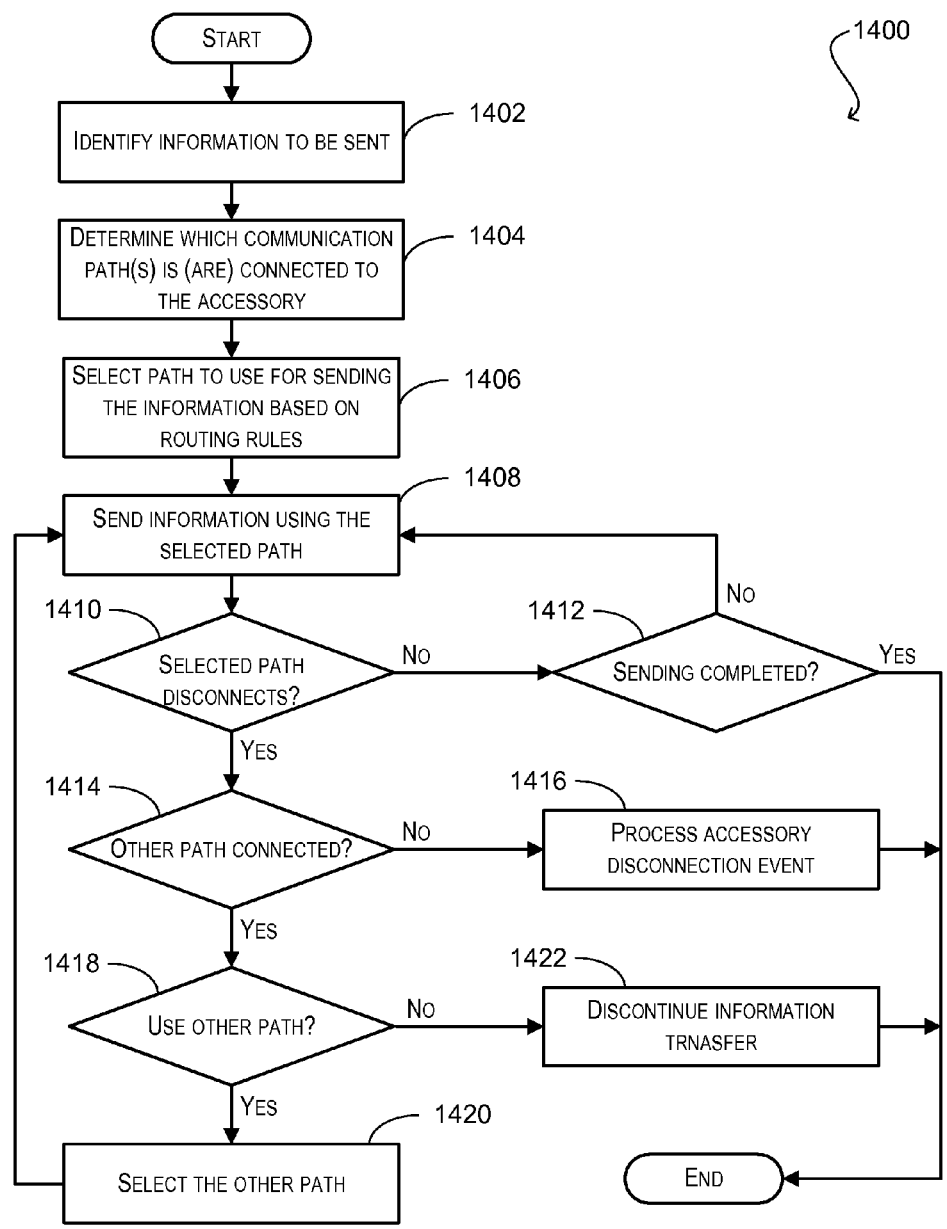
FIG. 14 is a flow diagram of a process for dynamically rerouting communications when a communication path is terminated according to an embodiment of the present invention.

FIG. 14 is a flow diagram of a process 1400 for dynamically rerouting communications when a communication path is terminated according to an embodiment of the present invention. Process 1400 can be performed by a host device, e.g., PMD 202 of FIG. 2 and can be invoked when sending information to an accessory (e.g., accessory 204). Process 1400 can be implemented by PMD 202 in hardware, software, or a combination thereof. As software, process 1400 can be encoded as program code stored on a machine-readable storage medium.

At block 1402, PMD 202 can identify information to be sent to an accessory that is connected via at least one communication path. Any type of information can be sent, including data objects (of fixed size), data streams (of indeterminate size), control signals, etc. At block 1404, PMD 202 can determine which communication paths are currently connected to accessory 204, e.g., by reference to the associations established at block 1312 of FIG. 13 described above. At block 1406, PMD 202 can select a communication path for the information. This selection can be based on the particular type of information being sent, the available communication paths and the routing policy of PMD 202, as described above. At block 1408, PMD 202 can begin to send the information using the selected communication path.

At block 1410, while sending the information, PMD 202 can detect whether the communication path becomes disconnected (or terminated or closed). For example, accessory 204 can notify PMD 202 of a disconnection using process 1100 described above, or PMD 202 can detect that the path is no longer connected (e.g., transmissions are not being acknowledged as expected). If the communication path remains connected, then at block 1412, PMD 202 can determine whether sending of the information is complete. As long as the selected channel remains connected, PMD 202 can continue sending until the sending is completed, at which point, process 1400 can end.

If, at block 1410, the selected communication path becomes disconnected before sending of the information is completed, then at block 1414, PMD 202 can determine whether another communication path to the same accessory is available. If no communication paths are available, then at block 1416, PMD 202 can process an accessory disconnection event. This can include terminating the in-process information transfer, invalidating or discarding any authentication or identification information associated with the accessory, decrementing a count of connected accessories, alerting a user to a lost connection, and/or other actions, after which process 1400 can end.

If, at block 1414, one or more other communication paths is still available (connected, or open), then at block 1418, PMD 202 can determine whether an available communication path should be used to continue the information transfer. This determination can be based on the routing policy, the type of information being transferred, characteristics of the available communication paths, and/or whether the available paths are currently in use. (For instance, it may be desirable not to transmit an audio stream over a low-bandwidth connection such as UART.)

If, at block 1418, it is determined that another communication path should be used, then at block 1420, PMD 202 can select the other communication path and continue sending information (block 1408). In some embodiments, process 1200 described above or a similar process can be used to manage the transition to the new communication path.

If, at block 1418, it is determined that another communication path should not be used, then at block 1422, PMD 202 can discontinue the information transfer. In this case, the accessory can remain connected, and PMD 202 can use a connected communication path to notify the accessory that the transfer has been discontinued.

It will be appreciated that processes 1300 and 1400 described herein are illustrative and that variations and modifications are possible. Steps described as sequential may be executed in parallel, order of steps may be varied, and steps may be modified, combined, added or omitted. Together, the two processes allow dynamic management of routing of data and control signals (or any other type of information). When new communication paths become available, the PMD can begin to use them to route information to the accessory, and if an existing communication path becomes disconnected, the PMD can reroute information onto a path that remains connected. The rerouting can be automated and transparent to the user.

Processes 1300 and 1400 can be used to dynamically reroute communication of any type of information, including data and/or control messages. In some embodiments, certain paths may be identified as data paths (used for communicating data) while other paths are identified as control paths (used for communicating control messages and/or other control signals); in some embodiments, the same path may be both a data path and a control path. Process 1300 can be used to reroute data and/or control messages independently of each other, depending on what paths of each type are currently available. Likewise, process 1400 can be used to dynamically reroute data to a different data path when an active data path disconnects and/or to dynamically reroute control messages to a different control path when an active control path disconnects.

Where data paths and control paths are distinct, block 1414 and/or block 1418 can include determining whether a path of the appropriate type (data or control) is connected. For example, suppose that an accessory is connected on a UART path and a Bluetooth path, either of which is capable of communicating control messages. At any given time, one path (e.g., UART) may be in use as the control path. If the path that is in used becomes disconnected, PMD 202 can decide to reroute control messages to a different path (e.g., the Bluetooth path). In some embodiments, PMD 202 can send a control message on the Bluetooth path indicating its intent to use the Bluetooth path as the new control path, and in some embodiments, accessory 204 can respond to accept or reject the new control path. In other embodiments, accessory 204 can select the new control path, e.g., by sending a control message on its preferred alternative control path when the previously active control path becomes disconnected.

In some embodiments, it is possible for all data paths to become disconnected while one or more control paths remain connected. If this occurs, PMD 202 can treat this as a disconnection event and disconnect all control paths, or PMD 202 can keep the control path(s) connected and wait for a new data path to become available. In some embodiments, there may be a timeout period during which PMD 202 waits for a data path and disconnects the control paths if no data path becomes available before the timeout period expires.

Similarly, in some embodiments, it is possible for all control paths to become disconnected while one or more data paths remain connected. If this occurs, PMD 202 can treat this as a disconnection event, discontinuing any in-progress data transfers and closing the data paths. In other embodiments, PMD 202 can allow in-progress data transfers to complete if the system is designed such that further control messages are not needed in connection with the data transfer.

Processes 1300 and 1400 have been described in the context of sending information to the accessory. It should be understood that similar processes can also be used to manage receiving information from the accessory. For example, in some embodiments, the PMD can route a request for information onto a particular communication path with the expectation that the accessory will respond using the same path. In some embodiments, the PMD can send instructions to the accessory to use a particular communication path for sending information of a certain type to the PMD.

Further, although processes 1300 and 1400 are described as being performed by a PMD, those skilled in the art will recognize that an accessory can implement similar processes if it is aware of being connected to the same PMD via multiple communication paths. For example, if the accessory detects that a new communication path to the same PMD is connected, the accessory can send a control message to the PMD to request that the routing be changed. As another example, if the accessory disconnects one communication path while another communication path remains connected to the same PMD, the accessory can send a control message to the PMD to request that information be routed over an available path.

The techniques described herein can be used to manage communication paths using any combination of protocols. As described above, in some embodiments, at least one of the communication paths supports an accessory protocol that allows enumeration of all of the accessory's communication paths (regardless of particular protocols associated with the various paths) and defines control messages usable to communicate between the host device and the accessory regarding the availability of various communication paths and any changes in the routing of information.

It is not required that all communication paths support the accessory protocol or that different communication paths support the same protocol. For instance, one communication path can be a Bluetooth path with the accessory protocol supported using the virtual serial port service defined by the Bluetooth protocol, while another communication path can be a standard USB path that does not support the accessory protocol. The accessory can provide its accessory identifier using any structure that a particular communication path supports (e.g., vendor-specific information in a USB path). As long as the accessory provides the same accessory identifier on each communication path, the PMD can recognize that connections are to the same device. In another example, a Bluetooth path need not support the accessory protocol; the accessory can provide its accessory identifier by sending vendor-specific information in the Bluetooth path.

While the invention has been described with respect to specific embodiments, one skilled in the art will recognize that numerous modifications are possible. For example, while specific reference is made to a PMD (a host device with media playback capability), the techniques described above are applicable to other host devices that are capable of interacting with accessories and that a host device is not required to have media playback capability. In some embodiments, circuits, processors, and/or other components of a host device and/or accessory may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on. Further, while the embodiments described above may make reference to specific hardware and software components, those skilled in the art will appreciate that different combinations of hardware and/or software components may also be used and that particular operations described as being implemented in hardware can also be implemented in software or vice versa.

Computer programs incorporating some or all features described herein may be encoded on various machine-readable storage media; suitable media include magnetic disk (including hard disk) or tape, optical storage media such as compact disk (CD) or DVD (digital versatile disk), flash memory, and the like. Machine-readable storage media encoded with the program code may be packaged with a compatible device or provided separately from other devices. In addition, program code may be encoded and transmitted via wired, optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for communicating between a host device and one or more accessories, the method comprising:
    establishing, by the host device, a first communication path, wherein establishing the first communication path includes receiving, by the host device, a first accessory identifier via the first communication path;
    establishing, by the host device, a second communication path, wherein establishing the second communication path includes receiving, by the host device, a second accessory identifier via the second communication path;
    determining, by the host device, whether the first accessory identifier and the second accessory identifier are the same;
    in the event that the first accessory identifier and the second accessory identifier are the same, determining, by the host device, that the same accessory is connected via both the first communication path and the second communication path; and
    in the event that the first accessory identifier and the second accessory identifier are not the same, determining, by the host device, that a first accessory is connected via the first communication path and a different accessory is connected via the second communication path.

2. The method of claim 1 wherein the first communication path uses a first transport and the second communication path uses a second transport different from the first transport.

3. The method of claim 2 wherein the first transport is a wireless transport and the second transport is a wired transport.

4. The method of claim 1, further comprising:
    in the event that the same accessory is connected via both the first communication path and the second communication path, selecting, by the host device, a routing path for a data stream to be sent to the accessory device, the selection being based on respective properties of the first communication path and the second communication path.

5. The method of claim 1 further comprising, in the event that the same accessory is connected via both the first communication path and the second communication path:
    sending a data stream via the first communication path;
    while sending the data stream, detecting whether the first communication path becomes closed; and
    in response to detecting that the first communication path is closed, redirecting, by the host device, the data stream to the second communication path.

6. A host device comprising:
    a processor;
    an interface coupled to the processor and configured to provide a plurality of communication paths connectable to one or more accessories; and
    a storage medium coupled to the processor, the storage medium containing program instructions that, when executed by the processor, cause the processor to:
        establish a first communication path with an accessory, wherein establishing the first communication path includes receiving, by the host device, a first accessory identifier via the first communication path;
        establish a second communication path, wherein establishing the second communication path includes receiving, by the host device, a second accessory identifier via the second communication path;
        determine whether the first accessory identifier and the second accessory identifier are the same;
        determine whether the same accessory is connected via both the first communication path and the second communication path based on whether the first accessory identifier and the second accessory identifier are the same; and
        in the event that the same accessory is connected via both the first communication path and the second communication path, select a routing path for a data stream to be sent to the accessory device, the selection being based on respective properties of the first communication path and the second communication path.

7. The host device of claim 6 wherein the plurality of communication paths include at least one of a Bluetooth communication path, a Wi Fi communication path, a USB communication path, or a wired serial communication path.

8. The host device of claim 6 wherein the first communication path uses a first transport and the second communication path uses a second transport different from the first transport.

9. The host device of claim 6 wherein the first transport is a wireless transport and the second transport is a wired transport.

10. The host device of claim 6, wherein, in the event that the same accessory is connected via both the first communication path and the second communication path, the program instructions, when executed by the processor, further cause the processor to select a routing path for a data stream to be sent to the accessory device, the selection being based on respective properties of the first communication path and the second communication path.

11. The host device of claim 6, wherein, in the event that the same accessory is connected via both the first communication path and the second communication path, the program instructions, when executed by the processor, further cause the processor to:
send a data stream via the first communication path;
detect whether the first communication path becomes closed while sending the data stream; and
in response to detecting that the first communication path becomes closed, redirect the data stream to the second communication path.

12. A method for communicating between an accessory and a host device, the method comprising:
establishing, by the accessory, a first communication path with a host device using a first transport;
sending, by the accessory, an accessory identifier to the host device via the first communication path;
while the first communication path remains open, establishing, by the accessory, a second communication path with the host device using a second transport that is different from the first transport; and
sending, by the accessory, the accessory identifier to the host device via the second communication path.

13. The method of claim 12 wherein the first communication path and the second communication path use different protocols.

14. The method of claim 13 wherein the first communication path uses an accessory communication protocol associated with host devices from a specific manufacturer.

15. The method of claim 14 further comprising:
sending, by the accessory to the host device via the first communication path, accessory preference information indicating a preferred usage of a plurality of available communication paths including the first communication path and the second communication path.

16. The method of claim 14 wherein the second communication path uses a protocol selected from a group consisting of a Universal Serial Bus (USB) protocol, a Bluetooth protocol, and a Wi Fi (IEEE 802.11) protocol.

17. An accessory comprising:
a processor;
an interface coupled to the processor and configured to provide a plurality of communication paths connectable to a host device; and
a storage medium coupled to the processor, the storage medium containing program instructions that, when executed by the processor, cause the processor to:
establish a first communication path with a host device using a first transport;
send an accessory identifier to the host device via the first communication path;
while the first communication path remains open, establish a second communication path with the host device using a second transport that is different from the first transport; and
send the accessory identifier to the host device via the second communication path.

18. The accessory of claim 17 wherein the first communication path and the second communication path use different protocols.

19. The accessory of claim 18 wherein the first communication path uses an accessory communication protocol associated with host devices from a specific manufacturer.

20. The accessory of claim 19 wherein the program instructions, when executed by the processor, further cause the processor to:
send to the host device, via the first communication path, accessory preference information indicating a preferred usage of a plurality of available communication paths including the first communication path and the second communication path.

21. The accessory of claim 19 wherein the second communication path uses a protocol selected from a group consisting of a Universal Serial Bus (USB) protocol, a Bluetooth protocol, and a Wi Fi (IEEE 802.11) protocol.

* * * * *